(12) United States Patent
Wang et al.

(10) Patent No.: US 10,967,561 B2
(45) Date of Patent: Apr. 6, 2021

(54) SYSTEM AND METHOD FOR CLOSE-PACKED GAS SPHERE THREE-DIMENSIONAL FABRICATION

(71) Applicant: National Taipei University of Technology, Taipei (TW)

(72) Inventors: Jia Chang Wang, Taipei (TW); Tseng Pu Yang, Singapore (SG)

(73) Assignee: National Taipei University of Technology, Taipei (TW)

( * ) Notice: Subject to any disclaimer, the term of this patent is extended or adjusted under 35 U.S.C. 154(b) by 296 days.

(21) Appl. No.: 16/010,472

(22) Filed: Jun. 17, 2018

(65) Prior Publication Data

US 2019/0381722 A1    Dec. 19, 2019

(51) Int. Cl.
| | |
|---|---|
| *B29C 64/112* | (2017.01) |
| *B29C 64/194* | (2017.01) |
| *B29C 64/264* | (2017.01) |
| *B29C 64/214* | (2017.01) |
| *B33Y 50/02* | (2015.01) |
| *B33Y 10/00* | (2015.01) |
| *B33Y 30/00* | (2015.01) |
| *B29C 64/393* | (2017.01) |

(52) U.S. Cl.
CPC .......... *B29C 64/112* (2017.08); *B29C 64/194* (2017.08); *B29C 64/214* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/112; B29C 64/194; B29C 64/214; B29C 64/264; B29C 64/393; B29C 64/336; B29C 64/314; B29C 64/124; B33Y 50/02; B33Y 10/00; B33Y 30/00; B33Y 40/00; B33Y 70/10
See application file for complete search history.

(56) References Cited

U.S. PATENT DOCUMENTS

| | | | |
|---|---|---|---|
| 5,258,146 A * | 11/1993 | Almquist | G01F 23/2921 264/401 |
| 2004/0159967 A1* | 8/2004 | Farnworth | B29C 64/188 264/71 |
| 2005/0009259 A1* | 1/2005 | Farnworth | B33Y 80/00 438/200 |
| 2011/0061535 A1* | 3/2011 | Mahaffy | B01D 19/0042 95/262 |

(Continued)

*Primary Examiner* — Nahida Sultana

(57) ABSTRACT

An additive manufacturing (AM) system and method configured to fabricate a 3D printed object from a liquid photocurable composition is provided. The AM system comprises a gas sphere assembly and an AM assembly. The gas sphere assembly comprises a prep chamber and a generation system having a generation chamber including a gas sphere generation unit, a jet source chamber including a sphere unit, and a gas chamber, a reservoir, and a gas cylinder. When a gas is fed to the gas chamber and the liquid photocurable composition is fed to the jet source chamber and generation chamber, the gas is pushed through a plurality of first openings of the sphere unit, and then a plurality of micro-openings of the gas sphere generation unit, to generate the plurality of closed-packed gas spheres. The plurality of closed-packed gas spheres are employed in the AM system for fabrication of the 3D printed object.

11 Claims, 12 Drawing Sheets

(56) References Cited

U.S. PATENT DOCUMENTS

| | | | |
|---|---|---|---|
| 2016/0303795 A1* | 10/2016 | Liu | B29C 64/25 |
| 2018/0162052 A1* | 6/2018 | Pearlson | B29C 64/314 |
| 2019/0001410 A1* | 1/2019 | Ho | B22F 3/22 |
| 2019/0111622 A1* | 4/2019 | Khalip | B29C 64/268 |
| 2019/0255612 A1* | 8/2019 | Mark | B29C 64/295 |
| 2019/0262901 A1* | 8/2019 | Huebinger | B29C 64/153 |
| 2020/0094322 A1* | 3/2020 | Van Rooyen | F28D 7/06 |
| 2020/0247039 A1* | 8/2020 | Jau | B29C 64/264 |
| 2020/0282640 A1* | 9/2020 | John | B29C 64/393 |

* cited by examiner

SYSTEM AND METHOD FOR CLOSE-PACKED GAS SPHERE THREE-DIMENSIONAL FABRICATION

TECHNICAL FIELD

The invention relates generally to the field of additive manufacturing (AM) and, more particularly, to a system and method for three-dimensional (3D) fabrication of close-packed gas sphere (CPGS) objects.

BACKGROUND

Additive manufacturing (AM) or three-dimensional (3D) printing translates computer-aided design (CAD) virtual 3D models into physical and functionally complex structured objects. By digital slicing of CAD, 3D scan, or tomography data, AM fabricates objects by successively stacking cross-sections layer-by-layer.

Among the AM processes for liquid photocurable compositions (e.g., polymeric materials), VAT photopolymerization is a process whereby a cross-section of a liquid photocurable composition in a vat is selectively cured or hardened by light-activated polymerization. A final object is fabricated in a layer-by-layer fashion as a build platform moves through the liquid photocurable composition along a z-axis.

For 3D printed objects fabricated using VAT photopolymerization, the mechanical properties thereof are dependent upon fabrication parameter choices. However, control and consistency of the mechanical properties is problematic as factors such as light source power, wavelength, fabrication speed, and liquid photocurable composition, among others, affect the curing or hardening of the liquid photocurable composition. This challenge is compounded when fabricating VAT photopolymerized 3D printed objects which are light in weight.

Fabrication of lighter VAT photopolymerized 3D printed objects have become popular, with fabrication cost and weight of 3D printed objects directly related to the weight and volume of the liquid photocurable composition effectively employed therein and emerging uses in different industry sectors, such as automotive and industrial manufacturing, aerospace, pharma and healthcare, retail, and sports. One technique used when designing weight effective 3D shapes is to reduce the interior material thereof while still fabricating a durable 3D printed object. However, there exist minimum feature size and structural design limitations for VAT photopolymerized 3D printed objects. In addition, light weight VAT photopolymerized 3D printed objects often suffer from inhomogeneous structural integrity as problematic control and consistency during the fabrication processes affects the mechanical properties thereof.

There is demand for a system and method for fabricating reduced interior material 3D printed objects employing an AM processes for liquid photocurable compositions to obviate the aforementioned problems.

SUMMARY

Additive manufacturing (AM) systems and methods for three-dimensional (3D) fabrication of close-packed gas sphere (CPGS) objects are provided.

In an embodiment, an AM system configured to fabricate a 3D printed object from a liquid photocurable composition is provided. The AM system comprises a gas sphere assembly, generating a plurality of close-packed gas spheres, each plurality of close-packed gas spheres comprising a pressurized gas surrounded by a thin film of a liquid photocurable composition. The AM system further comprises an AM assembly operatively associated with the gas sphere assembly, performing an AM irradiation method employing the plurality of close-packed gas spheres. AM irradiation methods employing the plurality of gas spheres include, but are not limited to, scan, spin, and selectively photocure (3SP), digital light processing (DLP) and stereolithography (SLA or SL) or other AM irradiation methods able to fabricate a 3D printed objects from a liquid photocurable composition employing top-down irradiation.

In an embodiment, the gas sphere assembly comprises a prep chamber, a first generation system operatively associated with the prep chamber, positioned thereunder, a reservoir operatively associated with the first generation system, feeding a liquid photocurable composition thereto, and a first gas cylinder, feeding the first gas to the first generation system, wherein the first gas comprises air, hydrogen, carbon dioxide, oxygen, nitrogen, or helium.

The prep chamber has a prep region and contains the plurality of close-packed gas spheres. The first generation system comprises a first generation chamber, a first jet source chamber, and a first gas chamber. The first generation chamber generates a plurality of first closed-packed gas spheres and comprises a first gas sphere generation unit and a first transfer region operatively associated with the prep chamber. The first gas sphere generation unit generates the plurality of first closed-packed gas spheres and has a plurality of first micro-openings therethrough. The first gas sphere generation unit is mounted on at least two opposing side walls of the first generation chamber via two opposing mounting assemblies. The two opposing mounting assemblies comprise a motor assembled to at least one of the opposing mounting assemblies, oscillating the first gas sphere generation unit back and forth in a longitudinal direction. The first jet source chamber comprises a first sphere unit and a first collapsing region operatively associated with the first generation chamber. The first sphere unit generates a plurality of first gas jet source spheres and has a plurality of first openings therethrough. The first sphere unit is mounted on at least two opposing side walls of the first jet source chamber. The reservoir feeds the liquid photocurable composition to the first jet source chamber and first generation chamber. A diameter of each of the plurality of first openings of the first sphere unit of the first jet source chamber is larger than a diameter of each of the plurality of first micro-openings of the first gas sphere generation unit of the first generation chamber. The first gas chamber feeds the first gas to the first jet source chamber and comprises a first inlet, receiving the first gas via the first gas cylinder, and a first gas region operatively associated with the first jet source chamber. The prep chamber of the gas sphere assembly and the first generation chamber, first jet source chamber, and first gas chamber of the first generation system are integrally formed.

In an embodiment, when the first gas is fed to the first gas chamber and the liquid photocurable composition is fed to the first jet source chamber and first generation chamber, the first gas is pushed from the first gas region through the plurality of first openings of the first sphere unit of the first jet source chamber to generate the plurality of first gas jet source spheres. Next, each of the plurality of first gas jet source spheres collapse and rupture via the oscillating first gas sphere generation unit, generating first gas jet streams. Following, at least a portion of the first gas jet streams push the first gas from the first collapsing region through the plurality of first micro-openings to the first transfer region, generating the plurality of first closed-packed gas spheres. Next, the plurality of first closed-packed gas spheres agglomerate in the prep region of the prep chamber as the plurality of closed-packed gas spheres for transfer to the AM assembly.

In an embodiment, the AM assembly comprises a wire skimmer blade, a build system, and an overflow tank. The wire skimmer blade is operatively associated with the gas sphere assembly and AM assembly via two opposing linear guides positioned therethrough. The wire skimmer blade transfers the plurality of close-packed gas spheres from the gas sphere assembly to the AM assembly. The build system is operatively associated with the wire skimmer blade and gas sphere assembly and fabricates the 3D printed object made of the plurality of close-packed gas spheres via the AM irradiation method of the AM system. The overflow tank is operatively associated with the build platform of the build system to contain excess plurality of close-packed gas spheres therein. The wire skimmer blade transfers and deposits the excess plurality of close-packed gas spheres not allocated to the layer of close-packed gas spheres on the build platform into the overflow tank.

The build system comprises a build platform and an energy source delivery system. The build platform is operatively associated with the prep region of the gas sphere assembly and moves in an upward and downward z-direction via an elevatable device operatively associated therewith. The wire skimmer blade, via the two opposing linear guides, transfers the plurality of close-packed gas spheres from the prep region to the build platform, forming a layer of close-packed gas spheres thereon. Each of the plurality of close-packed gas spheres forming the layer comprises attraction forces thereamong; thus, the layer of plurality of close-packed gas spheres is close-packed via the attraction forces. The energy source delivery system includes an energy source, and at least one optical device operatively associated with the energy source and build platform, irradiating the layer of close-packed gas spheres over the build platform. The at least one optical device is configured to selectively redirect a light of the energy source to the build platform, wherein a cross-sectional layer of a 3D printed object is at least partially cured or hardened. The energy source emits at least one of ultraviolet (UV) radiation, infrared (IR) radiation, or visible light.

The wire skimmer blade comprises a plurality of single wires mounted to at least two opposing braces, each having adjustable and variable speed motor assemblies thereon for attachment to two opposing linear guides and movement thereabout. The wire skimmer blade moves between the gas sphere assembly and the AM assembly at an angle to a longitudinal plane of the gas sphere assembly and the AM assembly of between 45° degrees and 90° degrees. A distance between the plurality of single wires is smaller than the diameter of the plurality of gas spheres, such that air flows therethrough and the plurality of gas spheres are intercepted, transferring the plurality of close-packed gas spheres from the gas sphere assembly to the AM assembly.

In an alternative embodiment, the gas sphere assembly further comprises a second generation system, also operatively associated with the prep chamber and positioned thereunder. In the embodiment, the first generation chamber, first jet source chamber, and first gas chamber of the first generation system are integrally formed and separate from the prep chamber of the gas sphere assembly and the second generation chamber, second jet source chamber, and second gas chamber of the second generation system are integrally formed and separate from the prep chamber of the gas sphere assembly. The gas sphere assembly comprises the prep chamber, the first generation system and the second generation system, both operatively associated with the prep chamber, separately and individually positioned thereunder, a reservoir operatively associated with the first generation system and the second generation system, feeding a liquid photocurable composition to both, and a first gas cylinder, feeding a first gas under pressure to the first generation system and a second gas cylinder, feeding a second gas under pressure to the second generation system, wherein the gasses comprise air, hydrogen, carbon dioxide, oxygen, nitrogen, or helium. The gas sphere assembly comprising the prep chamber, the first generation system, the reservoir, and the first gas cylinder and the AM assembly comprising the wire skimmer blade, the build system, and the overflow tank are similar and were described above in detail in conjunction with the previous embodiment descriptions, and are not repeated herein for purposes of brevity and clarity.

The prep chamber has a prep region and contains the plurality of close-packed gas spheres. Similar to the first generation system, the second generation system comprises a second generation chamber, a second jet source chamber, and a second gas chamber. The second generation chamber generates a plurality of second closed-packed gas spheres and comprises a second gas sphere generation unit and a second transfer region operatively associated with the prep chamber. The second gas sphere generation unit generates the plurality of second closed-packed gas spheres and has a plurality of second micro-openings therethrough. The second gas sphere generation unit is mounted on at least two opposing side walls of the second generation chamber via two opposing mounting assemblies. The two opposing mounting assemblies comprise a motor assembled to at least one of the opposing mounting assemblies, oscillating the second gas sphere generation unit back and forth in a longitudinal direction. The second jet source chamber comprises a second sphere unit and a second collapsing region operatively associated with the second generation chamber. The second sphere unit generates a plurality of second gas jet source spheres and has a plurality of second openings therethrough. The second sphere unit is mounted on at least two opposing side walls of the second jet source chamber. The reservoir feeds the liquid photocurable composition to the second jet source chamber and second generation chamber. A diameter of each of the plurality of second openings of the second sphere unit of the second jet source chamber is larger than a diameter of each of the plurality of second micro-openings of the second gas sphere generation unit. The second gas chamber feeds the second gas under pressure to the second jet source chamber and comprises a second inlet, receiving the second gas from the second gas cylinder, and a second gas region operatively associated with the second jet source chamber of the second generation chamber.

In an embodiment, when the second gas is fed to the second gas chamber and the liquid photocurable composition is fed to the second jet source chamber and second generation chamber, the second gas is pushed from the second gas region through the plurality of second openings of the second sphere unit of the second jet source chamber to generate the plurality of second gas jet source spheres. Next, each of the plurality of second gas jet source spheres collapse and rupture via the oscillating second gas sphere generation unit, generating second gas jet streams. Following, at least a portion of the second gas jet streams push the second gas from the second collapsing region through the plurality of second micro-openings to the second transfer region, generating the plurality of second closed-packed gas spheres. Next, the plurality of second closed-packed gas spheres agglomerates in the prep region of the prep chamber for transfer to the AM assembly. In an embodiment, the diameter of the plurality of first micro-openings is different from that of the diameter of the plurality of second micro-openings. The plurality of first closed-packed gas spheres and the plurality of second closed-packed gas spheres is both employed for 3D fabrication of CPGS objects.

In another alternative embodiment where the gas sphere assembly further comprises the second generation system, the first gas cylinder and the second gas cylinder are separate gas cylinders, wherein the gasses comprise air, hydrogen, carbon dioxide, oxygen, nitrogen, or helium and the diameter of the plurality of first micro-openings is different than that of the diameter of the plurality of second micro-openings. The gas sphere assembly comprising the prep chamber, the first generation system, the second generation system, the reservoir, the first gas cylinder, and the second gas cylinder and the AM assembly comprising the wire skimmer blade, the build system, and the overflow tank are similar and were described above in detail in conjunction with the previous embodiment descriptions, and are not repeated herein for purposes of brevity and clarity.

In yet another alternative embodiment where the gas sphere assembly further comprises the second generation system, the first gas cylinder and the second gas cylinder are the same gas cylinder, wherein the gasses comprise air, hydrogen, carbon dioxide, oxygen, nitrogen, or helium and the diameter of the plurality of first micro-openings is different than that of the diameter of the plurality of second micro-openings. The gas sphere assembly comprising the prep chamber, the first generation system, the second generation system, the reservoir, the first gas cylinder, and the second gas cylinder and the AM assembly comprising the wire skimmer blade, the build system, and the overflow tank are similar and were described above in detail in conjunction with the previous embodiment descriptions, and are not repeated herein for purposes of brevity and clarity.

In an embodiment, an AM method configured to fabricate a 3D printed object from a liquid photocurable composition is provided. The AM method comprises the steps of: Step (1050): generating a plurality of close-packed gas spheres via a gas sphere assembly, each plurality of close-packed gas spheres comprising a pressurized gas surrounded by a thin film of a liquid photocurable composition; and Step (2050): performing an AM irradiation method employing the plurality of close-packed gas spheres via an AM assembly operatively associated with the gas sphere assembly. AM irradiation methods employing the plurality of gas spheres include, but are not limited to, scan, spin, and selectively photocure (3SP), digital light processing (DLP) and stereolithography (SLA or SL) or other AM irradiation methods able to fabricate a 3D printed objects from a liquid photocurable composition employing top-down irradiation.

In an embodiment, Step (1050) comprises the steps of: Step (1100): feeding a first gas under pressure via a first gas cylinder to a first inlet of a first gas chamber of a first generation system operatively associated therewith for generation of a plurality of first gas jet source spheres, wherein the gas sphere assembly comprises a prep chamber, at least the first generation system, a reservoir, and at least the first gas cylinder, and the first gas comprises air, hydrogen, carbon dioxide, oxygen, nitrogen, or helium; Step (1200): feeding a liquid photocurable composition from the reservoir to a first jet source chamber and a first generation chamber of the first generation system operatively associated therewith for generation of the plurality of close-packed gas spheres; Step (1300): generating the plurality of first gas jet source spheres via the first gas entering a first gas region of the first gas chamber via the first inlet and being pushed through a plurality of first openings of a first sphere unit mounted on at least two opposing side walls of the first jet source chamber to a first collapsing region of the first jet source chamber operatively associated with a first transfer region of the first generation chamber positioned thereabove; and Step (1400): generating the plurality of first closed-packed gas spheres via collapsing and rupturing of each of the plurality of first gas jet source spheres and a first gas sphere generation unit mounted on at least two opposing side walls of the first generation chamber via two opposing mounting assemblies, oscillating back and forth in a longitudinal direction via a motor assembled to at least one of the opposing mounting assemblies, generating first gas jet streams, wherein at least a portion of the first gas jet streams push the first gas from a first collapsing region of a first jet source chamber through a plurality of first micro-openings of the first gas sphere generation unit to a first transfer region of the first generation chamber operatively associated with a prep region of the prep chamber positioned thereabove, wherein a diameter of each of the plurality of first openings is larger than a diameter of each of the plurality of first micro-openings, and wherein the plurality of first closed-packed gas spheres agglomerate in the prep region of the prep chamber as the plurality of closed-packed gas spheres for transfer to the AM assembly.

In an embodiment, if a second generation system is determined to be present, Step (1050) further comprises the steps of: Step (1102): feeding a second gas under pressure via a second gas cylinder to a second inlet of a second gas chamber of a second generation system operatively associated therewith for generation of a plurality of second gas jet source spheres, wherein the gas sphere assembly further comprises the second generation system and the second gas cylinder, and wherein the second gas comprises air, hydrogen, carbon dioxide, oxygen, nitrogen, or helium; Step (1202): feeding a liquid photocurable composition from the reservoir to a second jet source chamber and a second generation chamber of the second generation system operatively associated therewith for generation of the plurality of close-packed gas spheres; Step (1302): generating the plurality of second gas jet source spheres via the second gas entering a second gas region of the second gas chamber via the second inlet and being pushed through a plurality of second openings of a second sphere unit mounted on at least two opposing side walls of the second jet source chamber to a second collapsing region of the second jet source chamber operatively associated with a second transfer region of the second generation chamber positioned thereabove; and Step (1402): generating the plurality of second closed-packed gas spheres via collapsing and rupturing of each of the plurality of second gas jet source spheres and a second gas sphere generation unit mounted on at least two opposing side walls of the second generation chamber via two opposing mounting assemblies, oscillating back and forth in a longitudinal direction via a motor assembled to at least one of the opposing mounting assemblies, generating second gas jet streams, wherein at least a portion of the second gas jet streams push the second gas from a second collapsing region of a second jet source chamber through a plurality of second micro-openings of the second gas sphere generation unit to a second transfer region of the second generation chamber operatively associated with the prep region of the prep chamber positioned thereabove, wherein a diameter of each of the plurality of second openings is larger than a diameter of each of the plurality of second micro-openings, and wherein the first generation chamber, first jet source chamber, and first gas chamber of the first generation system are integrally formed and separate from the prep chamber of the gas sphere assembly and the second generation chamber, second jet source chamber, and second gas chamber are integrally formed and separate from the prep chamber of the gas sphere assembly, and wherein the plurality of first closed-packed gas spheres agglomerate in the prep region of the prep chamber as the plurality of closed-packed gas spheres for transfer to the AM assembly. The plurality of first closed-packed gas spheres and the plurality of second closed-packed gas spheres are both employed for 3D fabrication of CPGS objects.

In an embodiment, Step (2050) comprises the steps of: Step (2100): transferring the plurality of close-packed gas spheres from the prep region to a build system operatively associated therewith via a wire skimmer blade mounted to two opposing linear guides positioned throughout the gas sphere assembly and AM assembly, wherein the AM assembly comprises the wire skimmer blade, the build system, and an overflow tank, and wherein a layer of the plurality of close-packed gas spheres is formed over a build platform of the build system, and wherein the plurality of close-packed gas spheres forming the layer comprise attraction forces thereamong, wherein the layer of plurality of close-packed gas spheres is close-packed via the attraction forces; Step (2200): transferring excess plurality of close-packed gas spheres not allocated to the layer of close-packed gas spheres over the build platform to the overflow tank operatively associated with the build system via the wire skimmer blade, wherein the excess plurality of close-packed gas spheres are deposited into the overflow tank; Step (2300): irradiating the layer of close-packed gas spheres over the build platform via the AM irradiation method comprising an energy source delivery system of the build system, the energy source delivery system including an energy source and at least one optical device operatively associated with the build platform, selectively redirecting the energy source to the build platform, wherein a cross-sectional layer of a 3D printed object is at least partially cured, and wherein the energy source emits at least one of ultraviolet (UV) radiation, infrared (IR) radiation, or visible light; Step (2400): moving the build platform downwards in a z-direction by a distance greater than a layer thickness via an elevatable device operatively associated therewith; Step (2500): re-positioning the wire skimmer blade to an original position of the AM method; Step (2600): moving the build platform upwards in a z-direction to a layer thickness via the elevatable device operatively associated therewith; Step (2700): determining if an additional layer is needed, if no, performing Step (3000), if yes, performing Step (2800); Step (2800): determining if a second generation system is present, if no, repeating Step (1100), Step (1200), Step (1300), Step (1400), Step (2100), Step (2200), Step (2300), Step (2400), Step (2500), Step (2600), Step (2700), and Step (2800) a selected number of times to fabricate a selected number of successive layers, wherein the successive layers are bonded to each other, if yes, performing Step (2900); Step (2900): determining if a plurality of second closed-packed gas spheres is to be generated, if no, performing Step (1100), Step (1200), Step (1300), Step (1400), Step (2100), Step (2200), Step (2300), Step (2400), Step (2500), Step (2600), Step (2700), Step (2800), when determined, and Step (2900), when determined, if yes, performing Step (1102), Step (1202), Step (1302), Step (1402), Step (2100), Step (2200), Step (2300), Step (2400), Step (2500), Step (2600), Step (2700), Step (2800), when determined, and Step (2900), when determined, wherein the first closed-packed gas spheres layer and second closed-packed gas spheres layer are separately generated a selected number of times to fabricate a selected number of successive layers, wherein the successive layers are bonded to each other; and Step (3000): moving the build platform upwards in a z-direction to a longitudinal plane of the AM assembly via the elevatable device operatively associated therewith.

In an embodiment, a computer-readable medium comprising computer executable instructions which, when executed on a data processing apparatus, causes the data processing apparatus to perform a close-packed gas sphere (CPGS) additive manufacturing (AM) method to fabricate a three-dimensional (3D) object from a liquid photocurable composition, comprising: Step (1100): feeding a first gas under pressure via a first gas cylinder to a first inlet of a first gas chamber of a first generation system operatively associated therewith for generation of a plurality of first gas jet source spheres, wherein the gas sphere assembly comprises a prep chamber, at least the first generation system, a reservoir, and at least the first gas cylinder, and the first gas comprises air, hydrogen, carbon dioxide, oxygen, nitrogen, or helium; Step (1200): feeding a liquid photocurable composition from the reservoir to a first jet source chamber and a first generation chamber of the first generation system operatively associated therewith for generation of the plurality of close-packed gas spheres; Step (1300): generating the plurality of first gas jet source spheres via the first gas entering a first gas region of the first gas chamber via the first inlet and being pushed through a plurality of first openings of a first sphere unit mounted on at least two opposing side walls of the first jet source chamber to a first collapsing region of the first jet source chamber operatively associated with a first transfer region of the first generation chamber positioned thereabove; Step (1400): generating the plurality of first closed-packed gas spheres via collapsing and rupturing of each of the plurality of first gas jet source spheres and a first gas sphere generation unit mounted on at least two opposing side walls of the first generation chamber via two opposing mounting assemblies, oscillating back and forth in a longitudinal direction via a motor assembled to at least one of the opposing mounting assemblies, generating first gas jet streams, wherein at least a portion of the first gas jet streams push the first gas from the first collapsing region of the first jet source chamber through a plurality of first micro-openings of the first gas sphere generation unit to a first transfer region of the first generation chamber operatively associated with a prep region of the prep chamber positioned thereabove, wherein a diameter of each of the plurality of first openings is larger than a diameter of each of the plurality of first micro-openings, and wherein the plurality of first closed-packed gas spheres agglomerate in the prep region of the prep chamber as the plurality of closed-packed gas spheres for transfer to the AM assembly; Step (2100): transferring the plurality of close-packed gas spheres from the prep region to a build system operatively associated therewith via a wire skimmer blade mounted to two opposing linear guides positioned throughout the gas sphere assembly and AM assembly, wherein the AM assembly comprises the wire skimmer blade, the build system, and an overflow tank, and wherein a layer of the plurality of close-packed gas spheres is formed over a build platform of the build system, and wherein the plurality of close-packed gas spheres forming the layer comprise attraction forces thereamong, wherein the layer of plurality of close-packed gas spheres is close-packed via the attraction forces; Step (2200): transferring excess plurality of close-packed gas spheres not allocated to the layer of close-packed gas spheres over the build platform to the overflow tank operatively associated with the build system via the wire skimmer blade, wherein the excess plurality of close-packed gas spheres are deposited into the overflow tank; Step (2300): irradiating the layer of close-packed gas spheres over the build platform via an AM irradiation method comprising an energy source delivery system of the build system, the energy source delivery system including an energy source and at least one optical device operatively associated with the build platform, selectively redirecting the energy source to the build platform, wherein a cross-sectional layer of a 3D printed object is at least partially cured, and wherein the energy source emits at least one of ultraviolet (UV) radiation, infrared (IR) radiation, or visible light; Step (2400): moving the build platform downwards in a z-direction by a distance greater than a layer thickness via an elevatable device operatively associated therewith; Step (2500): re-positioning the wire skimmer blade to an original position of the AM method; Step (2600): moving the build platform upwards in a z-direction to a layer thickness via the elevatable device operatively associated therewith; Step (2700): determining if an additional layer is needed, if no, performing Step (3000), if yes, performing Step (2800); Step (2800): determining if a second generation system is present, if no, repeating Step (1100), Step (1200), Step (1300), Step (1400), Step (2100), Step (2200), Step (2300), Step (2400), Step (2500), Step (2600), Step (2700), and Step (2800) a selected number of times to fabricate a selected number of successive layers, wherein the successive layers are bonded to each other, if yes, performing Step (2900); Step (2900): determining if a plurality of second closed-packed gas spheres is to be generated, if no, performing Step (1100), Step (1200), Step (1300), Step (1400), Step (2100), Step (2200), Step (2300), Step (2400), Step (2500), Step (2600), Step (2700), Step (2800), when determined, and Step (2900), when determined, if yes, performing Step (1102), Step (1202), Step (1302), Step (1402), Step (2100), Step (2200), Step (2300), Step (2400), Step (2500), Step (2600), Step (2700), Step (2800), when determined, and Step (2900), when determined, wherein the first closed-packed gas spheres layer and second closed-packed gas spheres layer are separately generated a selected number of times to fabricate a selected number of successive layers, wherein the successive layers are bonded to each other, and wherein Step (1102), Step (1202), Step (1302), Step (1402) comprise: Step (1102): feeding a second gas under pressure via a second gas cylinder to a second inlet of a second gas chamber of the second generation system operatively associated therewith for generation of a plurality of second gas jet source spheres, wherein the gas sphere assembly further comprises the second generation system and the second gas cylinder, and wherein the second gas comprises air, hydrogen, carbon dioxide, oxygen, nitrogen, or helium; Step (1202): feeding a liquid photocurable composition from the reservoir to a second jet source chamber and a second generation chamber of the second generation system operatively associated therewith for generation of the plurality of close-packed gas spheres; Step (1302): generating the plurality of second gas jet source spheres via the second gas entering a second gas region of the second gas chamber via the second inlet and being pushed through a plurality of second openings of a second sphere unit mounted on at least two opposing side walls of the second jet source chamber to a second collapsing region of the second jet source chamber operatively associated with a second transfer region of the second generation chamber positioned thereabove; and Step (1402): generating the plurality of second closed-packed gas spheres via collapsing and rupturing of each of the plurality of second gas jet source spheres and a second gas sphere generation unit mounted on at least two opposing side walls of the second generation chamber via two opposing mounting assemblies, oscillating back and forth in a longitudinal direction via a motor assembled to at least one of the opposing mounting assemblies, generating second gas jet streams, wherein at least a portion of the second gas jet streams push the second gas from a second collapsing region of a second jet source chamber through a plurality of second micro-openings of the second gas sphere generation unit to a second transfer region of the second generation chamber operatively associated with the prep region of the prep chamber positioned thereabove, wherein a diameter of each of the plurality of second openings is larger than a diameter of each of the plurality of second micro-openings, and wherein the first generation chamber, first jet source chamber, and first gas chamber of the first generation system are integrally formed and separate from the prep chamber of the gas sphere assembly and the second generation chamber, second jet source chamber, and second gas chamber are integrally formed and separate from the prep chamber of the gas sphere assembly, and wherein the plurality of first closed-packed gas spheres agglomerate in the prep region of the prep chamber as the plurality of closed-packed gas spheres for transfer to the AM assembly. The plurality of first closed-packed gas spheres and the plurality of second closed-packed gas spheres are both employed for 3D fabrication of CPGS objects.

Non-limiting examples and specific embodiments of the present application are explained in greater detail in the drawings herein and the specification set forth below.

BRIEF DESCRIPTION OF THE DRAWINGS

The drawings referred to below should not be understood as being drawn to scale unless specifically noted.

DETAILED DESCRIPTION

Figure 1:
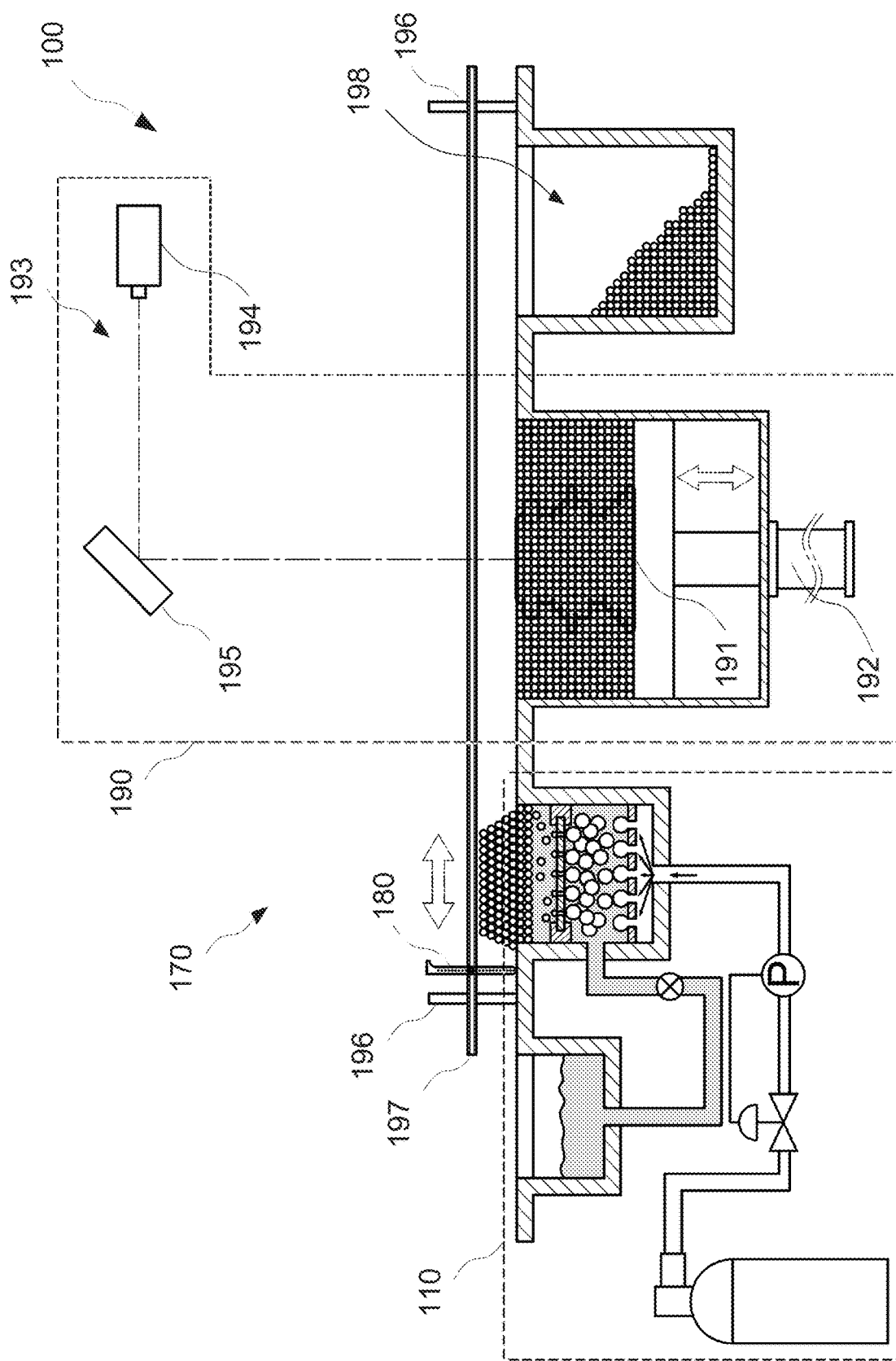
FIG. 1 is a schematic cross-sectional view illustrating a close-packed gas sphere (CPGS) additive manufacturing (AM) system according to various embodiments.

The present application is now described more fully hereinafter with reference to the accompanying drawings, in which embodiments of the invention are shown. This invention may, however, be embodied in many different forms and should not be construed as limited to various embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features can be exaggerated for clarity. Where used, broken lines illustrate optional features or operations unless specified otherwise.

The terminology used herein is for the function of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," as used herein, encompass the notions of "including" and "having" and specify the presence of stated features, integers, steps, operations, elements components and/or groups or combinations thereof, but do not preclude the presence or addition of one or more other features, integers, steps, operations, elements, components and/or groups or combinations thereof.

The use of "for example" or "such as" to list illustrative examples does not limit to only the listed examples. Thus, "for example" or "such as" means "for example, but not limited to" or "such as, but not limited to" and encompasses other similar or equivalent examples.

As used herein, the term "and/or" includes any and all possible combinations or one or more of the associated listed items, as well as the lack of combinations when interpreted in the alternative ("or").

As used herein, the terms "invention" or "present invention" are non-limiting terms and not intended to refer to any single aspect of the particular invention but encompass all possible aspects as described in the specification and the claims.

Unless otherwise defined, all terms (including technical and scientific terms) used herein have the same meaning as knowingly understood by one of ordinary skill in the art to which this invention belongs. It will be further understood that terms, such as those defined in knowingly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, can be used herein for ease of description to describe an element's or feature's relationship to another element's or feature's as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the function of explanation only, unless specifically indicated otherwise.

It will be understood that, although the terms first, second, etc., can be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present application. The sequence of operations (or steps) is not limited to the order presented in the claims or figures unless specifically indicated otherwise.

Disclosed herein are additive manufacturing (AM) systems and methods for three-dimensional (3D) fabrication of close-packed gas sphere (CPGS) objects. In various embodiments, VAT photopolymerization is employed whereby a cross-section of a liquid photocurable composition (e.g., polymeric materials), is selectively cured or hardened by light-activated polymerization as a build platform does not move through a polymerizable liquid photocurable composition. Some examples of VAT photopolymerization AM methods employing top-down irradiation include scan, spin, and selectively photocure (3SP), digital light processing (DLP) and stereolithography (SLA or SL) or other AM irradiation methods able to fabricate a 3D printed objects from a liquid photocurable composition employing top-down irradiation.

Figure 2A:
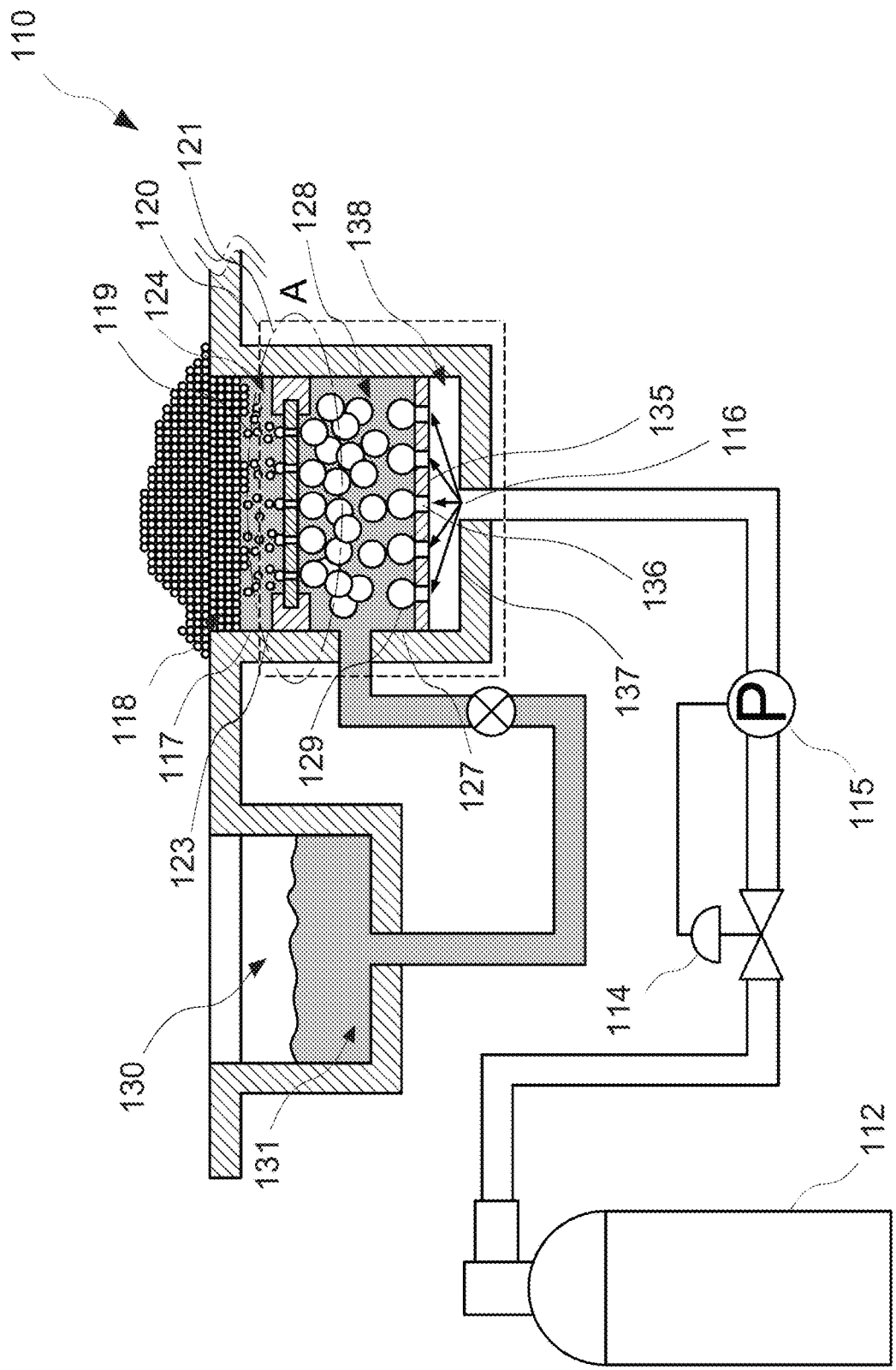
FIG. 2A is a schematic cross-sectional view illustrating a gas sphere assembly according to various embodiments.
Figure 2B:
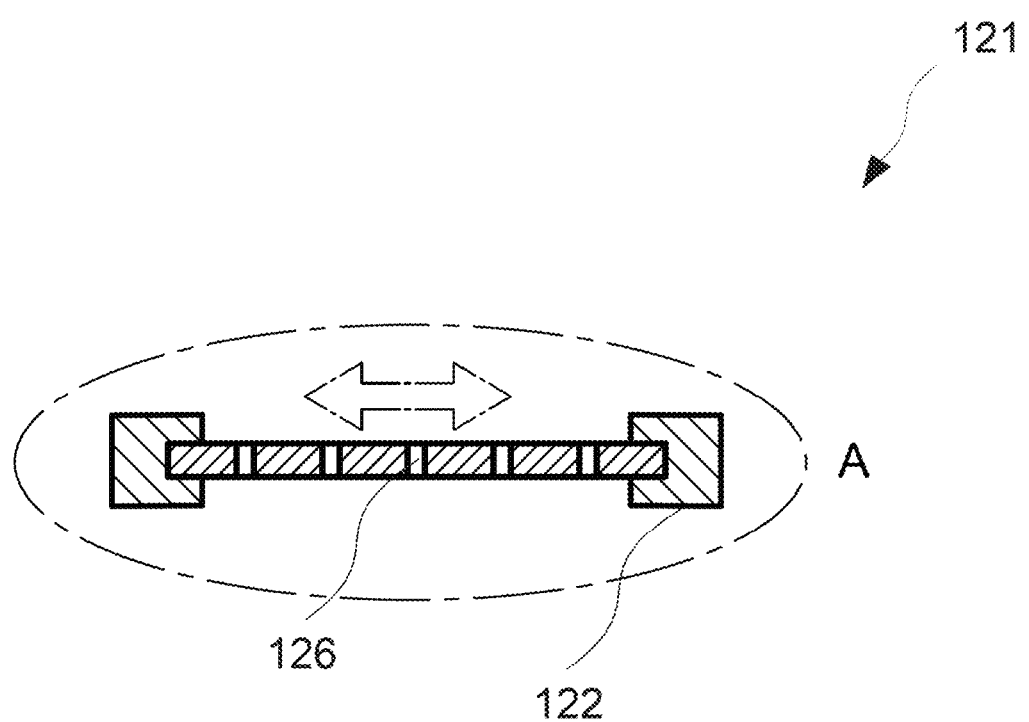
FIG. 2B is a schematic cross-sectional enlarged view illustrating a gas sphere generation unit A of the gas sphere assembly of FIG. 2A according to various embodiments.

FIG. 1 is a schematic cross-sectional view illustrating a close-packed gas sphere (CPGS) additive manufacturing (AM) system according to various embodiments. FIG. 2A is a schematic cross-sectional view illustrating a gas sphere assembly according to various embodiments and FIG. 2B is a schematic cross-sectional enlarged view illustrating a gas sphere generation unit A of the gas sphere assembly of FIG. 2A according to various embodiments. As shown in FIGS. 1 to 2B, the AM system 100 comprises a gas sphere assembly 110, generating a plurality of close-packed gas spheres 119, each plurality of close-packed gas spheres 119 comprising a pressurized gas surrounded by a thin film of a liquid photocurable composition 131. The AM system 100 further comprises an AM assembly 170 operatively associated with the gas sphere assembly 110, performing an AM irradiation method employing the plurality of close-packed gas spheres 119. AM irradiation methods employing the plurality of gas spheres include, but are not limited to, scan, spin, and selectively photocure (3SP), digital light processing (DLP) and stereolithography (SLA or SL) or other AM irradiation methods able to fabricate a 3D printed objects from a liquid photocurable composition employing top-down irradiation.

In an embodiment, the gas sphere assembly 110 comprises a prep chamber 117, a first generation system 120 operatively associated with the prep chamber 117, positioned thereunder, a reservoir 130 operatively associated with the first generation system 120, feeding a liquid photocurable composition 131 thereto, and a first gas cylinder 112, feeding a first gas under pressure to the first generation system 120, wherein the first gas comprises air, hydrogen, carbon dioxide, oxygen, nitrogen, or helium.

Referring again to FIGS. 1 to 2B, the prep chamber 117 has a prep region 118 and contains the plurality of close-packed gas spheres 119. The first generation system 120 comprises a first generation chamber 123, a first jet source chamber 127, and a first gas chamber 137. The first generation chamber 123 generates a plurality of first closed-packed gas spheres and comprises a first gas sphere generation unit 121 and a first transfer region 124 operatively associated with the prep chamber 117. The first gas sphere generation unit 121 generates the plurality of first closed-packed gas spheres and has a plurality of first micro-openings 126 therethrough. The first gas sphere generation unit 121 is mounted on at least two opposing side walls of the first generation chamber 123 via two opposing mounting assemblies 122. The two opposing mounting assemblies 122 comprise a motor (not graphically-illustrated) assembled to at least one of the opposing mounting assemblies 122, oscillating the first gas sphere generation unit 121 back and forth in a longitudinal direction. The first jet source chamber 127 comprises a first sphere unit 135 and a first collapsing region 128 operatively associated with the first generation chamber 123. The first sphere unit 135 generates a plurality of first gas jet source spheres 129 and has a plurality of first openings 136 therethrough. The first sphere unit 135 is mounted on at least two opposing side walls of the first jet source chamber 127. The reservoir 130 feeds the liquid photocurable composition 131 to the first jet source chamber 127 and first generation chamber 123. A diameter of each of the plurality of first openings 136 of the first sphere unit 135 of the first jet source chamber 127 is larger than a diameter of each of the plurality of first micro-openings 126 of the first gas sphere generation unit 121 of the first generation chamber 123. The first gas chamber 137 feeds the first gas under pressure to the first jet source chamber 127 and comprises a first inlet 116, receiving the first gas under pressure via the first gas cylinder 112, and a first gas region 138 operatively associated with the first jet source chamber 127. The prep chamber 117 of the gas sphere assembly 110 and the first generation chamber 123, first jet source chamber 127, and first gas chamber 137 of the first generation system 120 are integrally formed.

In an embodiment, when the first gas under pressure is fed to the first gas chamber 137 and the liquid photocurable composition 131 is fed to the first jet source chamber 127 and first generation chamber 123, the first gas is pushed from the first gas region 138 through the plurality of first openings 136 of the first sphere unit 135 of the first jet source chamber 127 to generate the plurality of first gas jet source spheres 129. Next, each of the plurality of first gas jet source spheres 129 collapse under pressure and rupture via the oscillating first gas sphere generation unit 121, generating first gas jet streams. Following, at least a portion of the first gas jet streams push the first gas from the first collapsing region 128 through the plurality of first micro-openings 126 to the first transfer region 124, generating the plurality of first closed-packed gas spheres. Next, the plurality of first closed-packed gas spheres agglomerate in the prep region 118 of the prep chamber 117 as the plurality of closed-packed gas spheres 119 for transfer to the AM assembly 170.

In an embodiment, the AM assembly 170 comprises a wire skimmer blade 180, a build system 190, and an overflow tank 198. The wire skimmer blade 180 is operatively associated with the gas sphere assembly 110 and AM assembly 170 via two opposing linear guides 197 positioned therethrough on supports 196. The wire skimmer blade 180 transfers the plurality of close-packed gas spheres 119 from the gas sphere assembly 110 to the AM assembly 170.

In various embodiments, the wire skimmer blade 180 transfers the plurality of close-packed gas spheres 119 from the gas sphere assembly 110 to the AM assembly 170 via the two opposing linear guides on supports 196; however, the invention is not limited thereto. In various embodiments, one linear guide on one support may be employed, or other guide-like means known in the art can be employed, so long as the wire skimmer blade 180 can transfer the plurality of close-packed gas spheres 119 from the gas sphere assembly 110 to the AM assembly 170.

The build system 190 is operatively associated with the wire skimmer blade 180 and gas sphere assembly 110 and fabricates the 3D printed object made of the plurality of close-packed gas spheres 119 via the AM irradiation method of the AM system 100. The overflow tank 198 is operatively associated with a build platform 191 of the build system 190 to contain excess plurality of close-packed gas spheres therein. The wire skimmer blade 180 transfers and deposits the excess plurality of close-packed gas spheres not allocated to the layer of close-packed gas spheres on the build platform 191 into the overflow tank 198.

The build system 190 comprises the build platform 191 and an energy source delivery system 193. The build platform 191 is operatively associated with the prep region 118 of the gas sphere assembly 110 and moves in an upward and downward z-direction via an elevatable device 192 operatively associated therewith.

In various embodiments, the build platform 191 is substantially level; however, the invention is not limited thereto. In various embodiments, the build platform 191 can be irregular such as convexly or concavely curved, or can have walls or trenches formed therein. In all examples, the build platform 191 can be smooth or textured, so long as the build platform 191 can move in an upward and downward z-direction via the elevatable device 192 for 3D fabrication of CPGS objects.

The wire skimmer blade 180, transfers the plurality of close-packed gas spheres 119 from the prep region 118 to the build platform 191, forming a layer of close-packed gas spheres thereon. Each of the plurality of close-packed gas spheres forming the layer comprises attraction forces thereamong; thus, the layer of plurality of close-packed gas spheres is close-packed via the attraction forces. The energy source delivery system 193 includes an energy source 194, and at least one optical device 195 operatively associated with the energy source 194 and build platform 191, irradiating the layer of close-packed gas spheres over the build platform 191. The at least one optical device 195 is configured to selectively redirect a light of the energy source 194 to the build platform 191, wherein a cross-sectional layer of a 3D printed object is at least partially cured or hardened. The energy source emits at least one of ultraviolet (UV) radiation, infrared (IR) radiation, or visible light.

Figure 3A:
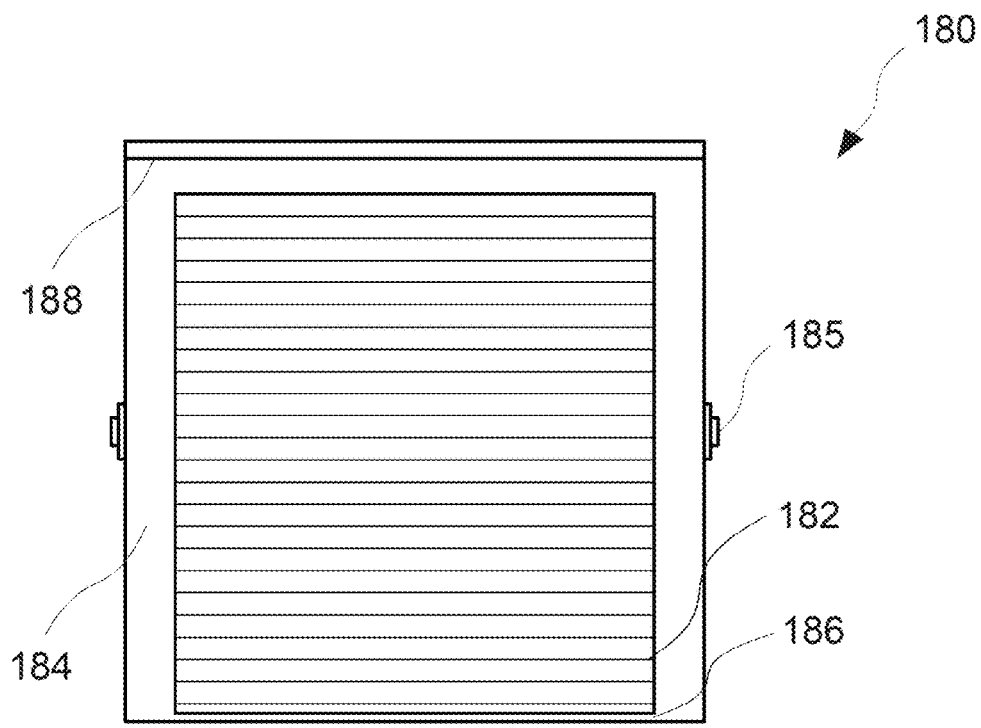
FIG. 3A is a schematic perspective front view illustrating a wire skimmer blade according to various embodiments.
Figure 3B:
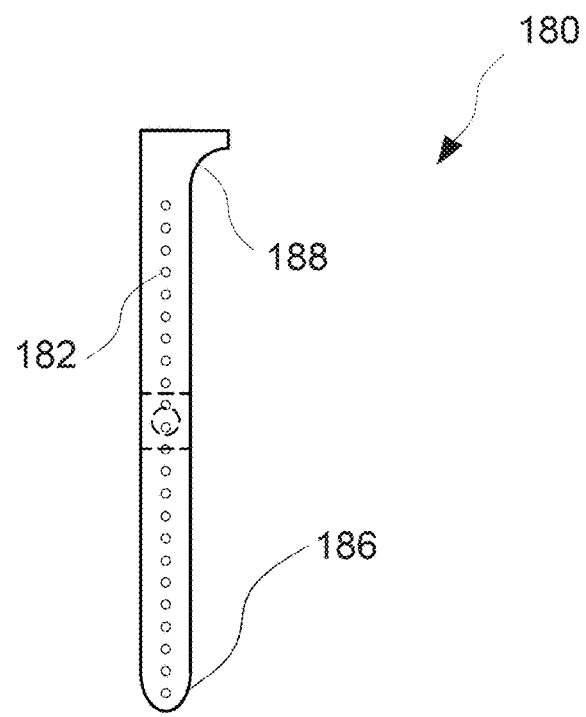
FIG. 3B is a schematic perspective side view illustrating a wire skimmer blade according to various embodiments.

FIG. 3A is a schematic perspective front view illustrating a wire skimmer blade according to various embodiments. FIG. 3B is a schematic perspective side view illustrating a wire skimmer blade according to various embodiments. As shown in FIGS. 3A to 3B, the wire skimmer blade 180 comprises a plurality of single wires 182 mounted to at least two opposing braces 184, each having adjustable and variable speed motor assemblies 185 thereon for attachment to the two opposing linear guides 197 and movement thereabout. In an embodiment, the wire skimmer blade 180 also comprises a lower frame 186 and an upper frame 188. The upper frame 188 is flared outwardly toward a transfer direction of the plurality of close-packed gas spheres 119, hindering the plurality of closed-packed gas spheres 119 from flowing to a non-, plurality of close-packed gas spheres 119, transfer side of the wire skimmer blade 180. A distance between the plurality of single wires 182 is smaller than the diameter of the plurality of gas spheres 119, such that air flows therethrough and the plurality of gas spheres 119 are intercepted, transferring the plurality of close-packed gas spheres 119 from the gas sphere assembly 110 to the AM assembly 170.

In various embodiments, the plurality of single wires 182 can be made of a non-stick metal; however, the invention is not limited thereto. In various embodiments, the plurality of single wires 182 can also be made of plastic or ceramic, and can be coated or not with a non-stick coating known in the art, depending upon the physical properties of the liquid photocurable composition used (e.g., viscosity etc.) and/or fabrication conditions, so long as the plurality of close-packed gas spheres 119 can be transferred from the gas sphere assembly 110 to the AM assembly 170.

In various embodiments, the at least two opposing braces 184 and lower frame 186 and an upper frame 188 can be made of a non-stick metal; however, the invention is not limited thereto. In various embodiments, the at least two opposing braces 184 and lower frame 186 and an upper frame 188 can also be made of plastic or ceramic, and can be coated or not with a non-stick coating known in the art, depending upon the physical properties of the liquid photocurable composition used (e.g., viscosity etc.) and/or fabrication conditions, so long as the plurality of close-packed gas spheres 119 can be transferred from the gas sphere assembly 110 to the AM assembly 170.

In various embodiments, the wire skimmer blade 180 comprises a plurality of single wires 182 and from a side view, is angularly shaped at a bottom thereof having a flared outwardly feature at a top thereof; however, the invention is not limited thereto. In various embodiments, the wire skimmer blade 180 can comprise of a solid form, depending upon the physical properties of the liquid photocurable composition used (e.g., viscosity etc.) and/or fabrication conditions, so long as the plurality of close-packed gas spheres 119 can be transferred from the gas sphere assembly 110 to the AM assembly 170 and a layer of closed-packed gas spheres 119 can be formed on the build platform 191. In various embodiments, the wire skimmer blade 180, from a side view, can comprise of a semi-angular shape at a bottom or top thereof, having various features or no features thereon, depending upon the physical properties of the liquid photocurable composition used (e.g., viscosity etc.) and/or fabrication conditions, so long as the plurality of close-packed gas spheres 119 can be transferred from the gas sphere assembly 110 to the AM assembly 170 and a layer of closed-packed gas spheres 119 can be formed on the build platform 191.

In various embodiments, the wire skimmer blade 180 can be interchangeable with wire skimmer blades of different lengths, widths, designs, shapes, materials or coatings, or any combination thereof and/or the height of the wire skimmer blade 180 can be adjusted, to transfer the plurality of closed-packed gas spheres 119 throughout the gas sphere assembly and AM assembly 170.

Figure 4A:
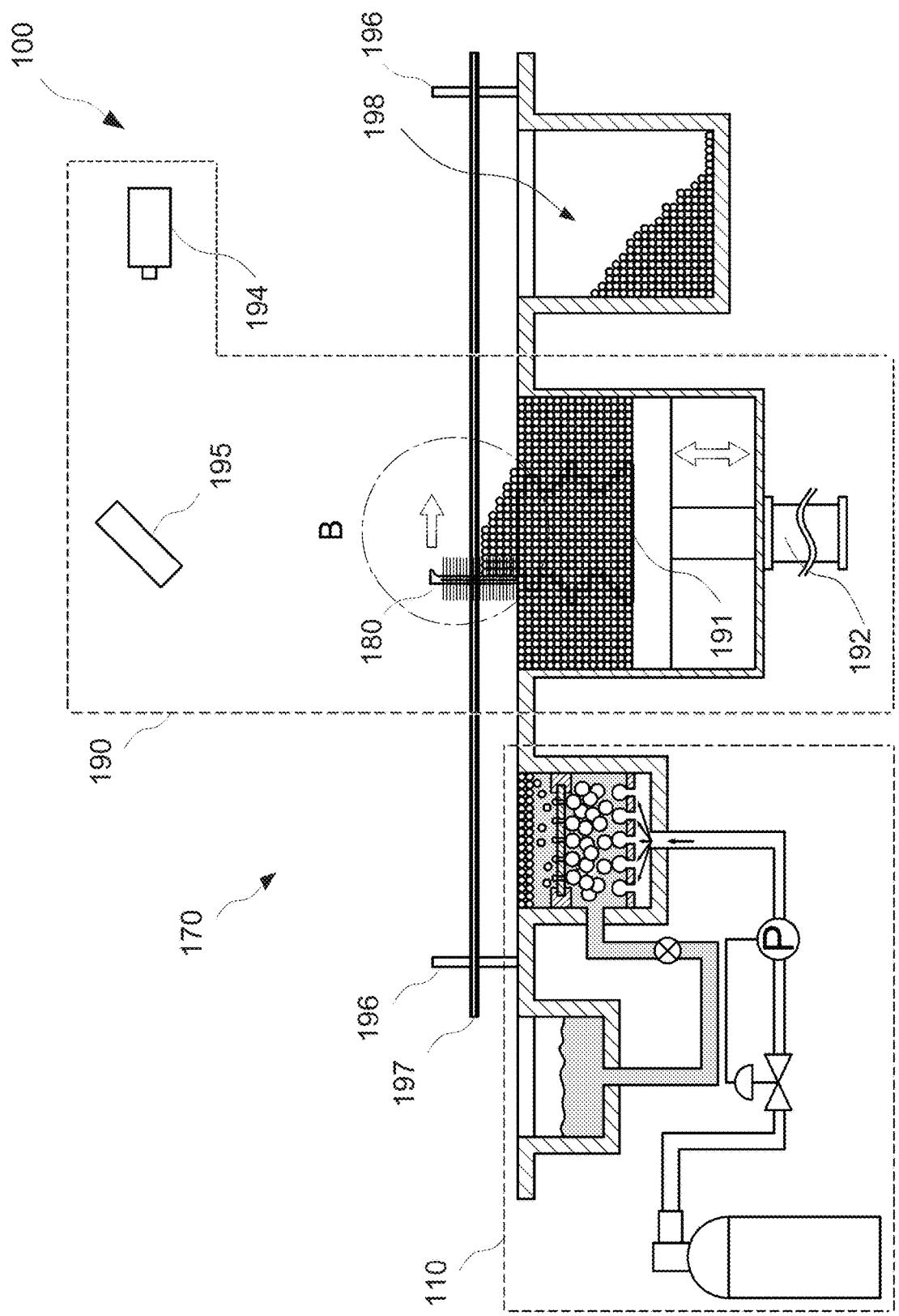
FIG. 4A is a schematic cross-sectional view illustrating a movement of a wire skimmer blade employed in a close-packed gas sphere (CPGS) additive manufacturing (AM) system according to various embodiments.
Figure 4B:
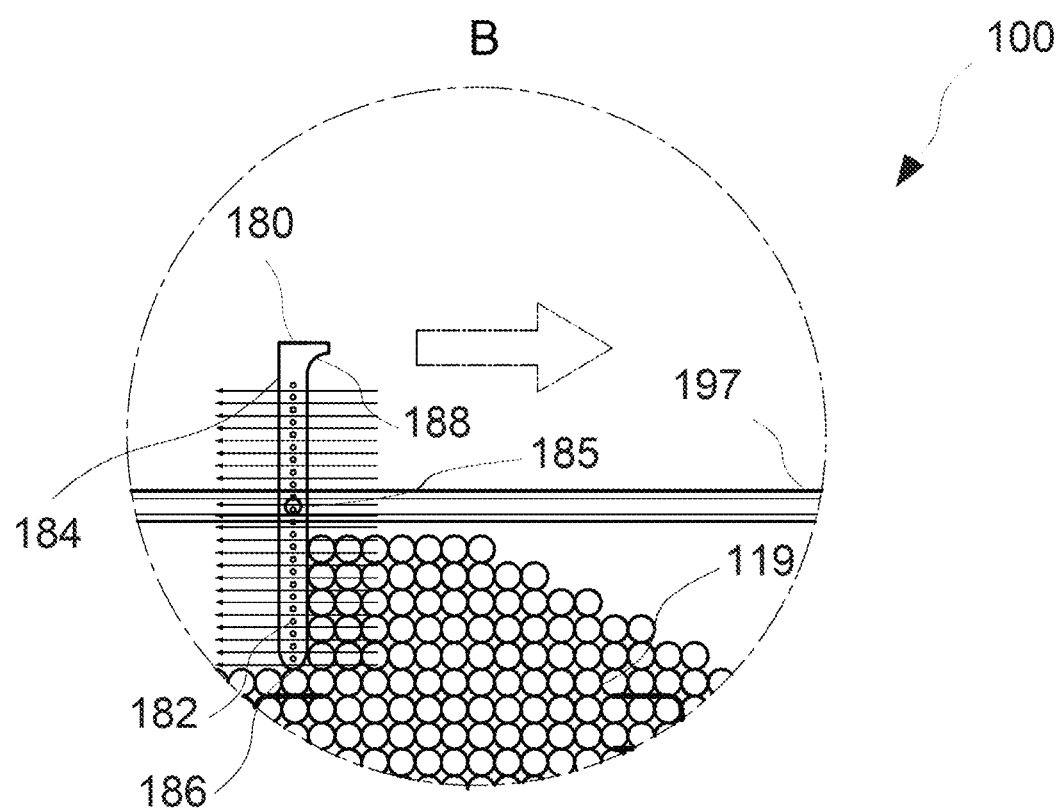
FIG. 4B is a schematic cross-sectional enlarged view illustrating the movement of the wire skimmer blade B employed in the close-packed gas sphere (CPGS) additive manufacturing (AM) system of FIG. 4A according to various embodiments.
Figure 5A:
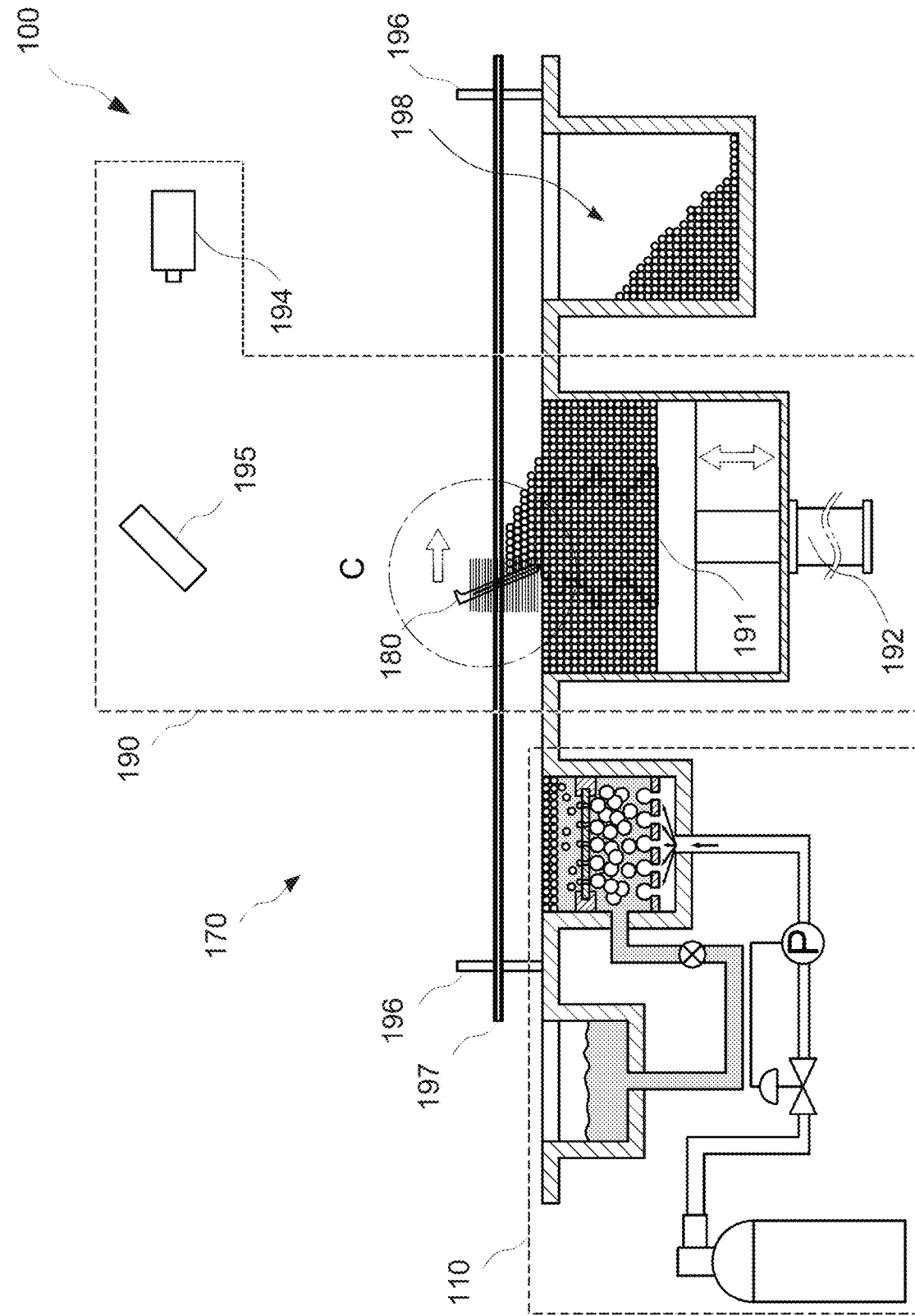
FIG. 5A is a schematic cross-sectional view illustrating a movement of a wire skimmer blade employed in a close-packed gas sphere (CPGS) additive manufacturing (AM) system according to various alternative embodiments.
Figure 5B:
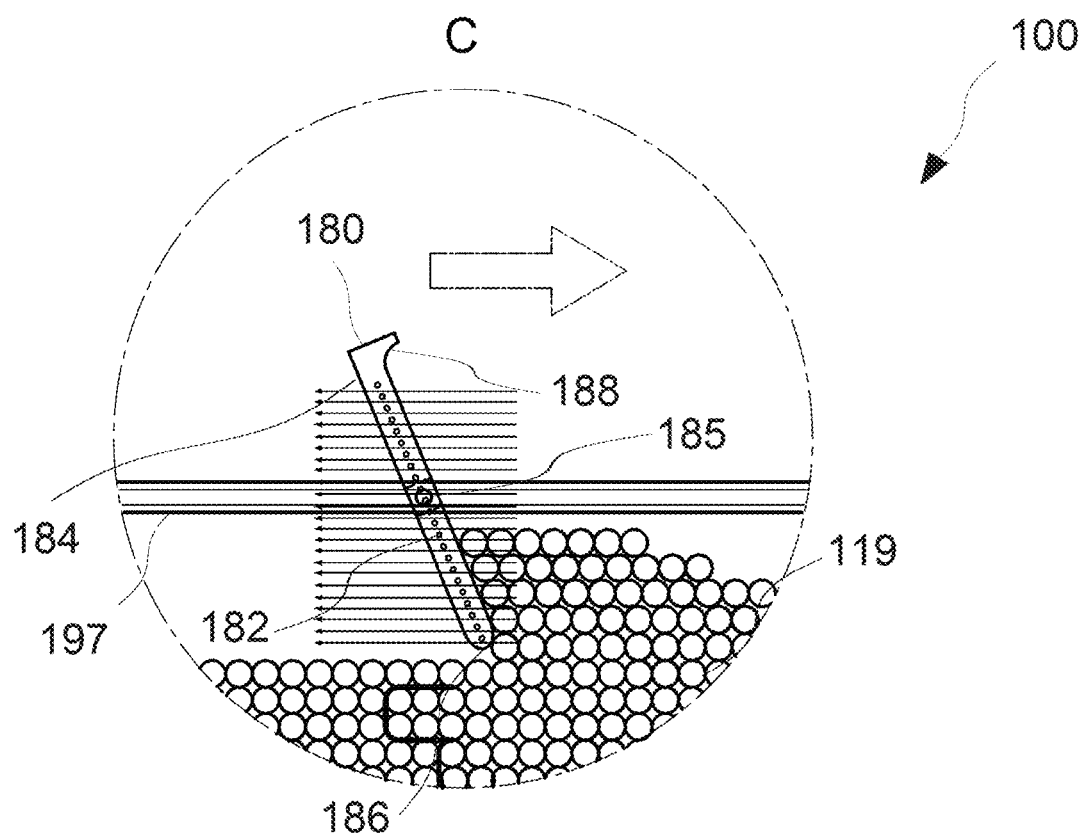
FIG. 5B is a schematic cross-sectional enlarged view illustrating the movement of the wire skimmer blade C employed in the close-packed gas sphere (CPGS) additive manufacturing (AM) system of FIG. 5A according to various alternative embodiments.

FIG. 4A is a schematic cross-sectional view illustrating a movement of a wire skimmer blade employed in a close-packed gas sphere (CPGS) additive manufacturing (AM) system according to various embodiments. FIG. 4B is a schematic cross-sectional enlarged view illustrating the movement of the wire skimmer blade B employed in the close-packed gas sphere (CPGS) additive manufacturing (AM) system of FIG. 4A according to various embodiments. FIG. 5A is a schematic cross-sectional view illustrating a movement of a wire skimmer blade employed in a close-packed gas sphere (CPGS) additive manufacturing (AM) system according to various alternative embodiments. FIG. 5B is a schematic cross-sectional enlarged view illustrating the movement of the wire skimmer blade C employed in the close-packed gas sphere (CPGS) additive manufacturing (AM) system of FIG. 5A according to various alternative embodiments. As shown in FIGS. 4A to 5B, the wire skimmer blade 180 moves between the gas sphere assembly 110 and the AM assembly 170 at an angle to a longitudinal plane of the gas sphere assembly 110 and the AM assembly 170 of between 45° degrees and 90° degrees via the variable speed motor assemblies 185 attached to the two opposing linear guides 197, forming the layer of closed-packed gas spheres 119 on the build platform 191 of the build system 190.

In various embodiments, any adjustable and variable speed motor-like means known in the art can be employed in the invention, so long as the wire skimmer blade 180 can move between the gas sphere assembly 110 and the AM assembly 170 at an angle to a longitudinal plane of the gas sphere assembly 110 and the AM assembly 170 of between 45° degrees and 90° degrees and at a speed where a layer of closed-packed gas spheres 119 can be formed on the build platform 191 of the build system 190.

Figure 6:
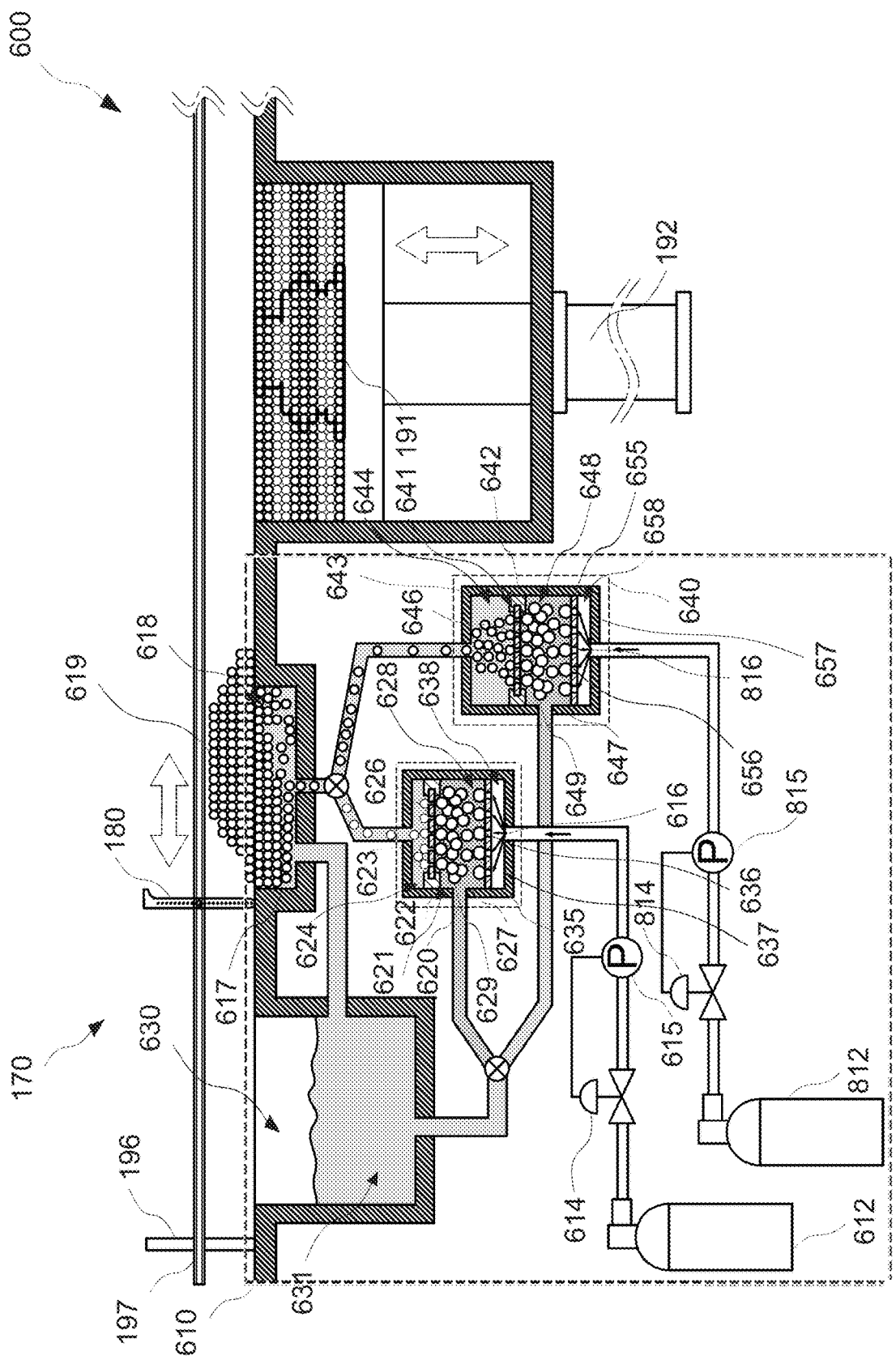
FIG. 6 is a schematic cross-sectional partial view illustrating a close-packed gas sphere (CPGS) additive manufacturing (AM) system according to various alternative embodiments.

FIG. 6 is a schematic cross-sectional partial view illustrating a close-packed gas sphere (CPGS) additive manufacturing (AM) system according to various alternative embodiments. As shown in FIG. 6, in an alternative embodiment, the gas sphere assembly 610 further comprises a second generation system 640, also operatively associated with the prep chamber 617 and positioned thereunder. In the embodiment, the first generation chamber 623, first jet source chamber 627, and first gas chamber 637 of the first generation system 620 are integrally formed and separate from the prep chamber 617 of the gas sphere assembly 610 and the second generation chamber 643, second jet source chamber 647, and second gas chamber 657 of the second generation system 640 are integrally formed and separate from the prep chamber 617 of the gas sphere assembly 610. The gas sphere assembly 610 comprises the prep chamber 617, the first generation system 620 and the second generation system 640, both operatively associated with the prep chamber 617, separately and individually positioned thereunder, a reservoir 630 operatively associated with the first generation system 620 and the second generation system 640, feeding a liquid photocurable composition 631 to both, and a first gas cylinder 612, feeding a first gas under pressure to the first generation system and a second gas cylinder 812, feeding a second gas under pressure to the second generation system 640, wherein the gases comprise air, hydrogen, carbon dioxide, oxygen, nitrogen, or helium. The gas sphere assembly 610 comprising the prep chamber 617, the first generation system 620, the reservoir 630, and the first gas cylinder 612 and the AM assembly 170 comprising the wire skimmer blade 180, the build system 190, and the overflow tank 198 are similar and were described above in detail in conjunction with the previous embodiment descriptions, and are not repeated herein for purposes of brevity and clarity.

The prep chamber 617 has a prep region 618 and contains the plurality of close-packed gas spheres 619. Similar to the first generation system 620, the second generation system 640 comprises a second generation chamber 643, a second jet source chamber 647, and a second gas chamber 657. The second generation chamber 643 generates a plurality of second closed-packed gas spheres and comprises a second gas sphere generation unit 641 and a second transfer region 644 operatively associated with the prep chamber 617. The second gas sphere generation unit 641 generates the plurality of second closed-packed gas spheres and has a plurality of second micro-openings 646 therethrough. The second gas sphere generation unit 641 is mounted on at least two opposing side walls of the second generation chamber 643 via two opposing mounting assemblies 642. The two opposing mounting assemblies comprise a motor (not graphically-illustrated) assembled to at least one of the opposing mounting assemblies 642, oscillating the second gas sphere generation unit 641 back and forth in a longitudinal direction. The second jet source chamber 647 comprises a second sphere unit 655 and a second collapsing region 648 operatively associated with the second generation chamber 643. The second sphere unit 655 generates a plurality of second gas jet source spheres 649 and has a plurality of second openings 656 therethrough. The second sphere unit 655 is mounted on at least two opposing side walls of the second jet source chamber 647. The reservoir 630 feeds the liquid photocurable composition 631 to the second jet source chamber 647 and second generation chamber 643. A diameter of each of the plurality of second openings 656 of the second sphere unit 655 of the second jet source chamber 647 is larger than a diameter of each of the plurality of second micro-openings 646 of the second gas sphere generation unit 641 of the second generation chamber 643. The second gas chamber 657 feeds the second gas under pressure to the second jet source chamber 647 and comprises a second inlet 656, receiving the second gas under pressure from the second gas cylinder 812, and a second gas region 658 operatively associated with the second jet source chamber 647 of the second generation chamber 643.

In an embodiment, when the second gas under pressure is fed to the second gas chamber 657 and the liquid photocurable composition 631 is fed to the second jet source chamber 647 and second generation chamber 643, the second gas is pushed from the second gas region 658 through the plurality of second openings 656 of the second sphere unit 655 of the second jet source chamber 647 to generate the plurality of second gas jet source spheres 649. Next, each of the plurality of second gas jet source spheres 649 collapse under pressure and rupture via the oscillating second gas sphere generation unit 641, generating second gas jet streams. Following, at least a portion of the second gas jet streams push the second gas from the second collapsing region 648 through the plurality of second micro-openings 646 to the second transfer region 644, generating the plurality of second closed-packed gas spheres. Next, the plurality of second closed-packed gas spheres agglomerates in the prep region 618 of the prep chamber 617 as the plurality of closed-packed gas spheres 619 for transfer to the AM assembly 170. The plurality of first closed-packed gas spheres and the plurality of second closed-packed gas spheres are both employed for 3D fabrication of CPGS objects.

In various embodiments, the two opposing mounting assemblies comprise a motor (not graphically-illustrated) assembled to at least one of the opposing mounting assemblies, oscillating the gas sphere generation unit back and forth in a longitudinal direction; however, the invention is not limited thereto. Any adjustable and variable speed motor-like means known in the art can be employed in the invention, so long as the two opposing mounting assemblies, having a motor (not graphically-illustrated) assembled to at least one of the opposing mounting assemblies, can oscillate the gas sphere generation unit back and forth in a longitudinal direction.

In another alternative embodiment where the gas sphere assembly 610 further comprises the second generation system 640, the first gas cylinder 612 and the second gas cylinder 812 are separate gas cylinders, wherein the gasses comprise air, hydrogen, carbon dioxide, oxygen, nitrogen, or helium and the diameter of the plurality of first micro-openings 626 is different than that of the diameter of the plurality of second micro-openings 646. The gas sphere assembly 610 comprising the prep chamber 617, the first generation system 620, the second generation system 640, the reservoir 630, and the first gas cylinder 612 and the AM assembly 170 comprising the wire skimmer blade 180, the build system 190, and the overflow tank 198 are similar and were described above in detail in conjunction with the previous embodiment descriptions, and are not repeated herein for purposes of brevity and clarity.

Figure 7:
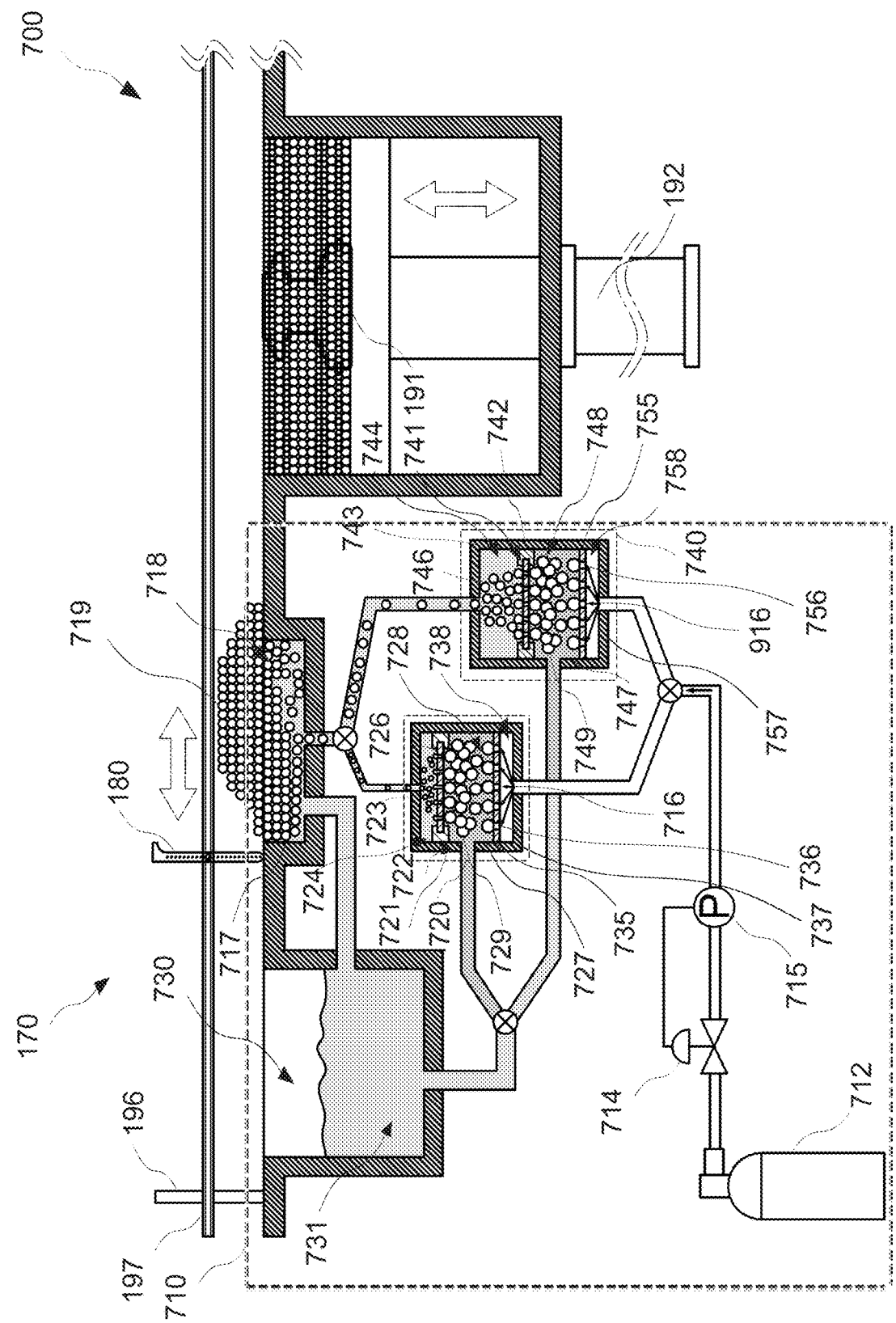
FIG. 7 is a schematic cross-sectional partial view illustrating a close-packed gas sphere (CPGS) additive manufacturing (AM) system according to yet other various alternative embodiments.

FIG. 7 is a schematic cross-sectional partial view illustrating a close-packed gas sphere (CPGS) additive manufacturing (AM) system according to yet other various alternative embodiments. As shown in FIG. 7, in yet another alternative embodiment, the gas sphere assembly 710 further comprises a second generation system 740 and the first gas cylinder 712 and the second gas cylinder 712 are the same gas cylinder, wherein the gasses comprise air, hydrogen, carbon dioxide, oxygen, nitrogen, or helium and the diameter of the plurality of first micro-openings 726 is different than that of the diameter of the plurality of second micro-openings 746. The gas sphere assembly 710 comprising the prep chamber 717, the first generation system 720, the second generation system 740, the reservoir 730, and the first gas cylinder 712 and the AM assembly 170 comprising the wire skimmer blade 180, the build system 190, and the overflow tank 198 are similar and were described above in detail in conjunction with the previous embodiment descriptions, and are not repeated herein for purposes of brevity and clarity.

Figure 8:
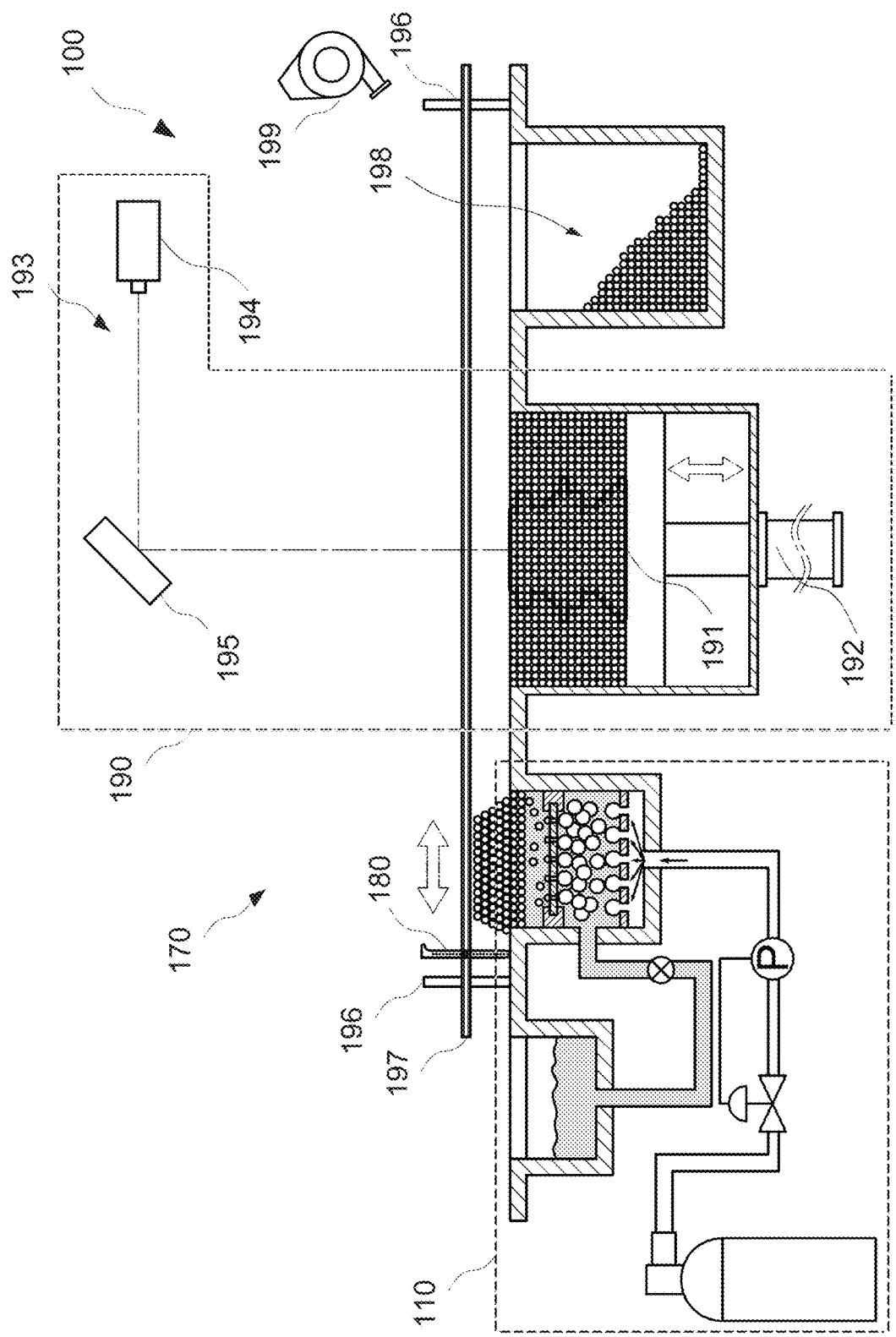
FIG. 8 is a schematic cross-sectional view illustrating a close-packed gas sphere (CPGS) additive manufacturing (AM) system according to yet other various alternative embodiments.

FIG. 8 is a schematic cross-sectional view illustrating a close-packed gas sphere (CPGS) additive manufacturing (AM) system according to yet other various alternative embodiments. As shown in FIG. 8, in yet another alternative embodiment, the gas sphere assembly 110 further comprises a blower 199, blowing the excess plurality of closed-packed gas spheres not allocated to the layer of close-packed gas spheres on the build platform 191 into the overflow tank 198 following transfer by the wire skimmer blade 180.

In various embodiments, any blower-like means known in the art can be employed in the invention, so long as the blower 199 can blow the excess plurality of closed-packed gas spheres not allocated to the layer of close-packed gas spheres on the build platform 191 into the overflow tank 198 following transfer by the wire skimmer blade 180.

The gas sphere assembly 110 comprising the prep chamber 117, the first generation system 120, the reservoir 130, and the first gas cylinder 112 and the AM assembly 170 comprising the wire skimmer blade 180, the build system 190, and the overflow tank 198 are similar and were described above in detail in conjunction with the previous embodiment descriptions, and are not repeated herein for purposes of brevity and clarity.

In various embodiments, a pump and a valve can be used to control the feeding of the liquid photocurable composition to the generation systems; however, the invention is not limited thereto. In various embodiments, any pump-like and valve-like means known in the art can be employed in the invention, so long as the liquid photocurable composition can be controlled and fed to the generation systems.

In various embodiments, any suitable liquid photocurable composition can be used for enablement. The liquid photocurable composition can include a monomer, particularly photopolymerizable and/or free radical polymerizable monomers, a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof.

In various embodiments, the liquid photocurable composition is generally flowable and can be in the form of a liquid, slurry, or gel, alternatively a liquid or slurry, alternatively a liquid. Viscosity of the liquid photocurable composition can be adjusted depending on the type of AM irradiation method employed and its dispensing techniques and other considerations. Adjusting viscosity can be achieved, for example, by heating or cooling the liquid photocurable composition, adjusting molecular weight of one or more components thereof, by adding or removing a solvent, carrier and/or diluent, by adding a filler or thixotropic agent, etc.

In various embodiments, the liquid photocurable composition can have additional ingredients solubilized therein, including pigments, dyes, active compounds or pharmaceutical compounds, detectable compounds (e.g., fluorescent, phosphorescent, radioactive), etc., depending upon the particular function of the object being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

In various embodiments, the inhibitors or polymerization inhibitors used can be in the form of a liquid or a gas. In some embodiments, gas inhibitors are preferred. The specific inhibitor will depend upon the monomer being polymerized and the polymerization reaction. For free radical polymerization monomers, the inhibitor can be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as trace amines or carbon dioxide.

In various embodiments, the gas cylinder is operatively connected to the generation system via a pressure regulation valve and a manometer, suitably disposed therebetween. The pressure regulation valve precisely controls the pressure of the gas fed from the gas cylinder to the generation system. The pressure of the gas in the generation system is monitored by the manometer. At the connection between the gas cylinder and generation system, a pressure release valve (not graphically-illustrated) can be provided for decreasing the applied pressure gradually down to environmental pressure (atmospheric pressure).

In various embodiments, the generation systems comprise a generation chamber, a jet source chamber, and a gas chamber; however, the invention is not limited thereto. In various embodiments, the generation systems can comprise a generation chamber and a gas chamber or a generation chamber, or a combination thereof, or any system known in the art, depending upon the physical properties of the liquid photocurable composition used (e.g., viscosity etc.) and/or fabrication conditions, so long as the system is able to generate the plurality of gas spheres.

Figure 9:
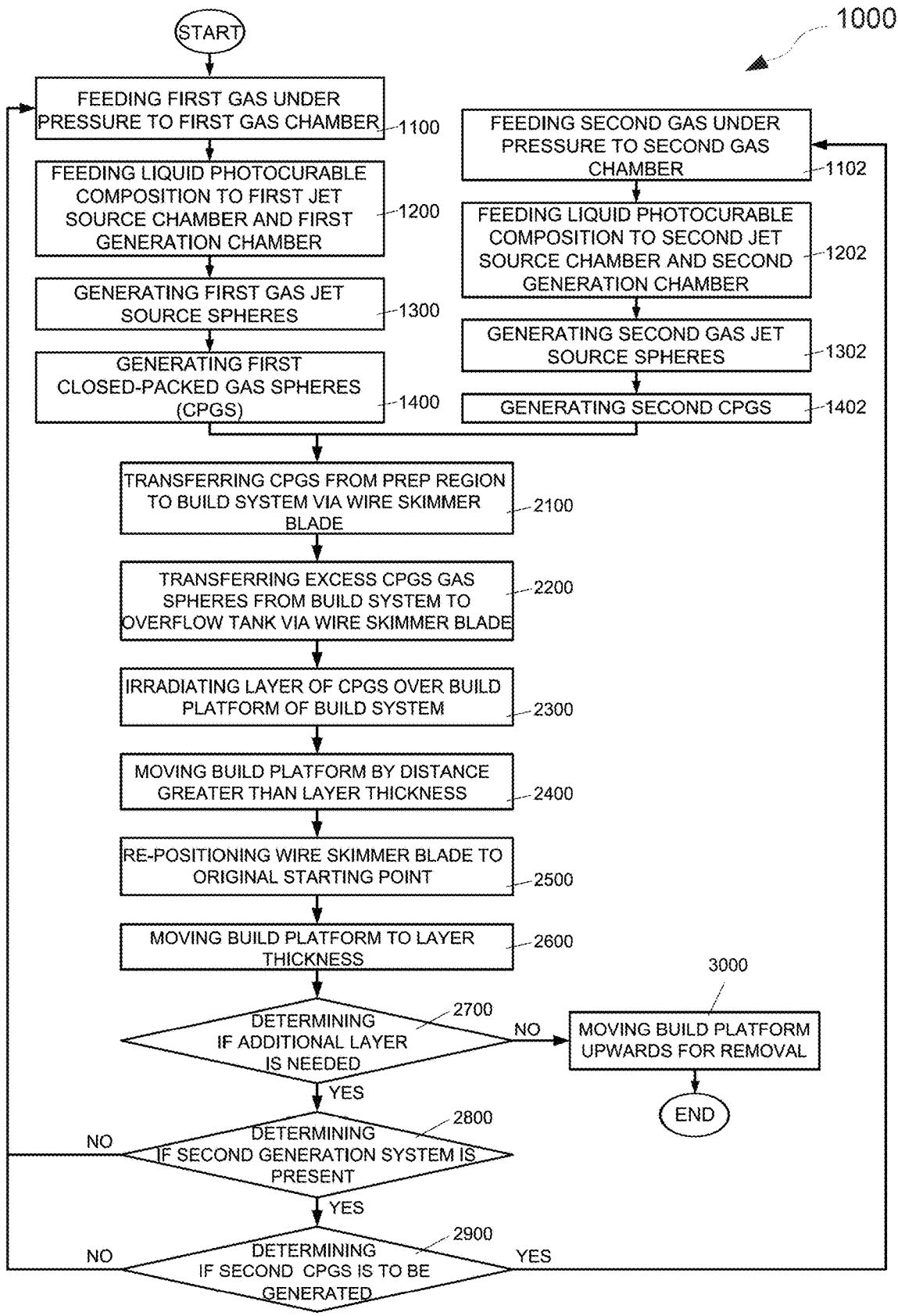
FIG. 9 is a flowchart illustrating a close-packed gas sphere (CPGS) additive manufacturing (AM) method according to various embodiments.

FIG. 9 is a flowchart illustrating a close-packed gas sphere (CPGS) additive manufacturing (AM) method according to various embodiments. As shown in FIG. 9 and referring to FIGS. 1 to 7, in an embodiment, the AM method comprises the steps of: Step (1050): generating a plurality of close-packed gas spheres via a gas sphere assembly, each plurality of close-packed gas spheres comprising a pressurized gas surrounded by a thin film of a liquid photocurable composition; and Step (2050): performing an AM irradiation method employing the plurality of close-packed gas spheres via an AM assembly operatively associated with the gas sphere assembly. AM irradiation methods employing the plurality of gas spheres include, but are not limited to, scan, spin, and selectively photocure (3SP), digital light processing (DLP) and stereolithography (SLA or SL) or other AM irradiation methods able to fabricate a 3D printed objects from a liquid photocurable composition employing top-down irradiation.

In an embodiment, Step (1050) comprises the steps of: Step (1100): feeding a first gas under pressure via a first gas cylinder to a first inlet of a first gas chamber of a first generation system operatively associated therewith for generation of a plurality of first gas jet source spheres, wherein the gas sphere assembly comprises a prep chamber, at least the first generation system, a reservoir, and at least the first gas cylinder, and the first gas comprises air, hydrogen, carbon dioxide, oxygen, nitrogen, or helium; Step (1200): feeding a liquid photocurable composition from the reservoir to a first jet source chamber and a first generation chamber of the first generation system operatively associated therewith for generation of the plurality of close-packed gas spheres; Step (1300): generating the plurality of first gas jet source spheres via the first gas under pressure entering a first gas region of the first gas chamber via the first inlet and being pushed through a plurality of first openings of a first sphere unit mounted on at least two opposing side walls of the first jet source chamber to a first collapsing region of the first jet source chamber operatively associated with a first transfer region of the first generation chamber positioned thereabove; and Step (1400): generating the plurality of first closed-packed gas spheres via collapsing and rupturing of each of the plurality of first gas jet source spheres under pressure and a first gas sphere generation unit mounted on at least two opposing side walls of the first generation chamber via two opposing mounting assemblies, oscillating back and forth in a longitudinal direction via a motor assembled to at least one of the opposing mounting assemblies, generating first gas jet streams, wherein at least a portion of the first gas jet streams push the first gas from a first collapsing region of a first jet source chamber through a plurality of first micro-openings of the first gas sphere generation unit to a first transfer region of the first generation chamber operatively associated with a prep region of the prep chamber positioned thereabove, wherein a diameter of each of the plurality of first openings is larger than a diameter of each of the plurality of first micro-openings, and wherein the plurality of first closed-packed gas spheres agglomerate in the prep region of the prep chamber for transfer to the AM assembly.

In an embodiment, if a second generation system is determined to be present, Step (1050) further comprises the steps of: Step (1102): feeding a second gas under pressure via a second gas cylinder to a second inlet of a second gas chamber of a second generation system operatively associated therewith for generation of a plurality of second gas jet source spheres, wherein the gas sphere assembly further comprises the second generation system and the second gas cylinder, and wherein the second gas comprises air, hydrogen, carbon dioxide, oxygen, nitrogen, or helium; Step (1202): feeding a liquid photocurable composition from the reservoir to a second jet source chamber and a second generation chamber of the second generation system operatively associated therewith for generation of the plurality of close-packed gas spheres; Step (1302): generating the plurality of second gas jet source spheres via the second gas under pressure entering a second gas region of the second gas chamber via the second inlet and being pushed through a plurality of second openings of a second sphere unit mounted on at least two opposing side walls of the second jet source chamber to a second collapsing region of the second jet source chamber operatively associated with a second transfer region of the second generation chamber positioned thereabove; and Step (1402): generating the plurality of second closed-packed gas spheres via collapsing and rupturing of each of the plurality of second gas jet source spheres under pressure and a second gas sphere generation unit mounted on at least two opposing side walls of the second generation chamber via two opposing mounting assemblies, oscillating back and forth in a longitudinal direction via a motor assembled to at least one of the opposing mounting assemblies, generating second gas jet streams, wherein at least a portion of the second gas jet streams push the second gas from a second collapsing region of a second jet source chamber through a plurality of second micro-openings of the second gas sphere generation unit to a second transfer region of the second generation chamber operatively associated with the prep region of the prep chamber positioned thereabove, wherein a diameter of each of the plurality of second openings is larger than a diameter of each of the plurality of second micro-openings, and wherein the first generation chamber, first jet source chamber, and first gas chamber of the first generation system are integrally formed and separate from the prep chamber of the gas sphere assembly and the second generation chamber, second jet source chamber, and second gas chamber are integrally formed and separate from the prep chamber of the gas sphere assembly, and wherein the plurality of first closed-packed gas spheres agglomerate in the prep region of the prep chamber for transfer to the AM assembly. The plurality of first closed-packed gas spheres and the plurality of second closed-packed gas spheres are both employed for 3D fabrication of CPGS objects.

In various embodiments, the pressure of the gas under pressure can be whatever is sufficient to perform the feeding gas Step (1100) and Step (1102), wherein the gas under pressure is fed through the inlet of the generation system and the gas comprises air, hydrogen, carbon dioxide, oxygen, nitrogen, or helium. For example, and not to be limiting, a pressure of 1, 10, 20, 30 or 40 pounds per square inch (PSI) can be used.

In various embodiments, the sphere units and the gas sphere assemblies can be made of a non-stick metal; however, the invention is not limited thereto. In various embodiments, the sphere units and the gas sphere assemblies can also be made of plastic or ceramic, and can be coated or not with a non-stick coating known in the art, depending upon the physical properties of the liquid photocurable composition used (e.g., viscosity etc.) and/or fabrication conditions, so long as the plurality of gas jet source spheres and plurality of close-packed gas spheres, respectively, can be generated.

In various embodiments, a motor is assembled to at least one of the opposing mounting assemblies of the two opposing mounting assemblies of the gas sphere generation unit for longitudinal oscillation back and forth of the gas sphere generation unit; however, the invention is not limited thereto. Any variable speed motor-like means known in the art can be employed in the invention for oscillating of the gas sphere generation unit, so long as the gas sphere generation unit can oscillate back and forth in a longitudinal direction, generating the plurality of closed-packed gas spheres.

In various embodiments, as an example, and not to be limiting, the oscillation frequency of the generation chambers by a motor thereof, can range from 1 Hz to 200 kHz, alternatively, from 1 kHz to 20 kHz, depending upon the physical properties of the liquid photocurable composition used (e.g., viscosity etc.) and/or fabrication conditions, so long as the plurality of closed-packed gas spheres can be generated. A higher oscillation frequency can generally result in the diameter of the plurality of closed-packed gas spheres to be smaller.

In various embodiments, as an example, and not to be limiting, the diameter of the plurality of openings of the sphere units can be in a range of from substantially 5 μm up to 2 mm, depending upon the physical properties of the liquid photocurable composition used (e.g., viscosity etc.) and/or fabrication conditions, so long as the diameter of the plurality of openings is larger than the diameter of the plurality of micro-openings of the gas sphere generation assemblies and the plurality of gas jet source spheres can be generated.

In various embodiments, the plurality of openings of the sphere units are disposed annularly, expanding outwardly from a center thereof, such that the gas pressure pushed through each of the plurality of openings is similar; however, the invention is not limited thereto. In various embodiments, the plurality of openings of the sphere units can be disposed linearly in rows and columns, annularly, or in other shapes and designs known in the art, or combinations thereof, depending upon the gas used, gas pressure, physical properties of the liquid photocurable composition used (e.g., viscosity etc.) and/or fabrication conditions, so long as the plurality of gas jet source spheres can be generated.

In various embodiments, a gas guide (not graphically-illustrated) is disposed over the inlet of the generation system, controlling the direction and release pressure of the gas toward the plurality of openings such that the gas pressure pushed through each plurality of openings is similar. In various embodiments, any combination of shapes, and/or design of the disposition of the plurality of openings of the sphere units and gas guide can be employed, depending upon the gas used, gas pressure, physical properties of the liquid photocurable composition used (e.g., viscosity etc.) and/or fabrication conditions, so long as the plurality of gas jet source spheres can be generated.

In various embodiments, as an example, and not to be limiting, the diameter of the plurality of micro-openings of the gas sphere generation assemblies can be in a range of from substantially 5 μm up to 2 mm, depending upon the physical properties of the liquid photocurable composition used (e.g., viscosity etc.) and/or fabrication conditions, so long as the diameter of the plurality of micro-openings is smaller than the diameter of the plurality of openings of the sphere units.

In various embodiments, the plurality of micro-openings of the gas sphere generation units are disposed linearly in rows and columns, such that the at least a portion of the gas jet streams being pushed through each of the plurality of micro-openings is similar; however, the invention is not limited thereto. In various embodiments, the plurality of micro-openings of the gas sphere generation units can be disposed, annularly, linearly in rows and columns or in other shapes and designs known in the art, or combinations thereof, depending upon the gas used, agglomeration of the plurality of gas jet source spheres, physical properties of the liquid photocurable composition used (e.g., viscosity etc.) and/or fabrication conditions, so long as the plurality of closed-packed gas spheres can be generated.

In various embodiments, the plurality of closed-packed gas spheres and the plurality of gas jet source spheres emerging from the micro-openings and openings, respectively, are, in general, generated in a dilated form having a size larger than the sizes of the micro-openings and openings, respectively. When the micro-openings and openings are too close together, respectively, adjacent closed-packed gas spheres and gas jet source spheres may be integrated thereamong, to form closed-packed gas spheres and gas jet source spheres of larger sizes. In various embodiments, to mitigate integration, the pitch or distance between adjacent micro-openings and openings, respectively, is, for example, larger than 3 times; however, the invention is not limited thereto. Other pitch sizes can be used to mitigate integration of the closed-packed gas spheres and gas jet source spheres, respectively.

In an embodiment, Step (2050) comprises the steps of: Step (2100): transferring the plurality of close-packed gas spheres from the prep region to a build system operatively associated therewith via a wire skimmer blade mounted to two opposing linear guides positioned throughout the gas sphere assembly and AM assembly, wherein the AM assembly comprises the wire skimmer blade, the build system, and an overflow tank, and wherein a layer of the plurality of close-packed gas spheres is formed over a build platform of the build system, and wherein the plurality of close-packed gas spheres forming the layer comprise attraction forces thereamong, wherein the layer of plurality of close-packed gas spheres is close-packed via the attraction forces; Step (2200): transferring excess close-packed gas spheres not allocated to the layer of close-packed gas spheres over the build platform to the overflow tank operatively associated with the build system via the wire skimmer blade, wherein the excess close-packed gas spheres are deposited into the overflow tank; Step (2300): irradiating the layer of close-packed gas spheres over the build platform via the AM irradiation method comprising an energy source delivery system of the build system, the energy source delivery system including an energy source and at least one optical device operatively associated with the build platform, selectively redirecting the energy source to the build platform, wherein a cross-sectional layer of a 3D printed object is at least partially cured, and wherein the energy source emits at least one of ultraviolet (UV) radiation, infrared (IR) radiation, or visible light; Step (2400): moving the build platform downwards in a z-direction by a distance greater than a layer thickness via an elevatable device operatively associated therewith; Step (2500): re-positioning the wire skimmer blade to an original position of the AM method; Step (2600): moving the build platform upwards in a z-direction to a layer thickness via the elevatable device operatively associated therewith; Step (2700): determining if an additional layer is needed, if no, performing Step (3000), if yes, performing Step (2800); Step (2800): determining if a second generation system is present, if no, repeating Step (1100), Step (1200), Step (1300), Step (1400), Step (2100), Step (2200), Step (2300), Step (2400), Step (2500), Step (2600), Step (2700), and Step (2800) a selected number of times to fabricate a selected number of successive layers, wherein the successive layers are bonded to each other, if yes, performing Step (2900); Step (2900): determining if a plurality of second closed-packed gas spheres is to be generated, if no, performing Step (1100), Step (1200), Step (1300), Step (1400), Step (2100), Step (2200), Step (2300), Step (2400), Step (2500), Step (2600), Step (2700), Step (2800), when determined, and Step (2900), when determined, if yes, performing Step (1102), Step (1202), Step (1302), Step (1402), Step (2100), Step (2200), Step (2300), Step (2400), Step (2500), Step (2600), Step (2700), Step (2800), when determined, and Step (2900), when determined, wherein the first closed-packed gas spheres layer and second closed-packed gas spheres layer are separately generated a selected number of times to fabricate a selected number of successive layers, wherein the successive layers are bonded to each other; and Step (3000): moving the build platform upwards in a z-direction to a longitudinal plane of the AM assembly via the elevatable device operatively associated therewith.

In various embodiments, the energy source is an actinic radiation source, such as one or more light sources, and alternatively one or more ultraviolet light sources; however, the invention is not limited thereto. Any suitable light source known in the art, emitting various wavelengths across the electromagnetic spectrum, can be used, such as a laser, light-emitting diode, etc., including arrays thereof, depending upon the physical properties of the liquid photocurable composition used (e.g., viscosity etc.) and/or fabrication conditions, so long as the plurality of closed-packed gas spheres can be at least partially cured or hardened. In various embodiments, the energy source alternatively includes more than one optical device. In various embodiments, the energy source comprises a digital micromirror device (DMD) with digital light processing (DLP), a spatial light modulator (SLM), or a microelectromechanical system (MEMS) mirror array, a mask (e.g., a reticle), a silhouette, or a combination thereof, depending upon the physical properties of the liquid photocurable composition used (e.g., viscosity etc.) and/or fabrication conditions, so long as the plurality of closed-packed gas spheres can be can be at least partially cured or hardened.

In various embodiments, more than one energy source can be employed. In various embodiments, the energy source and the at least one optical device are stationary; however, the invention is not limited thereto. In various embodiments, either, or both of the energy source and at least one optical device can be moveable relative to the build platform, so long as the plurality of closed-packed gas spheres can be can be at least partially cured or hardened.

In various embodiments, 3D printing of the subsequent layer occurs before the at least partially cured layer has reached a final cure state. The distinction between partially cured or final cure is whether the partially cured layer can undergo further curing or cross-linking. Functional groups can be present even in the final cure or hardened state, but can remain unreacted due to steric hindrance or other factors. In these embodiments, 3D printing of the layers can be considered wet-on-wet such that the adjacent layers at least physically bond, and may also chemically bond, to one another. For example, it is possible that components in each of the layers chemically cross-link, curing or hardening across the print line, such that the irradiating Step (2300) may affect the curing or hardening of more than just the subsequently 3D printed layer. Thus, a composite including the various layers can be subjected to the curing or hardening condition and any other partially cured or hardened layers may also further, alternatively fully, cure or harden upon a subsequent irradiating step.

In various embodiments, the greater than layer thickness moving Step (2400) is carried out sequentially in uniform increments. In various embodiments, the layer thickness moving Step (2600) can be carried out sequentially in uniform increments, as an example and not to be limiting, in a range of from substantially 0.05 mm up to 2 mm, or more for each step or increment.

The layer (or first, prior, or previous layer), subsequent layer (or second or latter layer), and any additional layers are collectively referred to as 'the layers' herein. 'The layers,' as used herein in plural form, may relate to the layers at any stage of the inventive method, e.g., in an uncured state, in a partially cured state, in a final cure or hardened state, etc. The term 'layer' in singular form designates the first layer printed with the plurality of closed-packed gas spheres of the liquid photocurable composition.

As with the layer, the subsequent layer formed by printing the closed-packed gas spheres may have any shape and dimension. For example, the subsequent layer need not be continuous or have a consistent thickness. Further, the subsequent layer may differ from the layer in terms of shape, dimension, size, etc. The subsequent layer may only contact a portion of an exposed surface of the at least partially cured layer. For example, depending on the desired shape of the 3D printed objects, the subsequent layer may be built on the layer selectively.

The layers can each be of various dimensions including thickness and width. Thickness and/or width tolerances of the layers may depend on the AM irradiation method used, with certain AM irradiation method processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently can have an average thickness in a range of from substantially 0.05 mm up to 2 mm, alternatively, 0.1 mm to 0.5 mm. Thinner and thicker thicknesses are also contemplated. The invention is not limited to any particular dimensions of any of the layers.

In various embodiments, as an example, and not to be limiting, the inner diameter of the plurality of closed-packed gas spheres can be in a range of from substantially, 10 µm up to 2 mm, alternatively, 0.2 mm to 0.5 mm. In various embodiments, the size of the plurality of closed-packed gas spheres is substantially maintained throughout the transfer and irradiation Step (2100) to Step (2300).

By 'substantially', it is meant that at least substantially 50%, 60%, 70%, 80%, 90%, 95%, 96%, 97%, 98%, 99%, 99.5%, 99.9%, 99.99%, or at least substantially 99.999% or more of the volume of the generated gas spheres is maintained in the same shape and dimension over a period of time, e.g., after 1 minute, 5 minutes, 10 minutes, 30 minutes, 1 hour, 4 hours, 8 hours, 12 hours, 1 day, 1 week, 1 month, etc.

In various embodiments, as an example, and not to be limiting, the wall thickness of the plurality of closed-packed gas spheres can be in a range of from substantially 0.1 µm up to 1 mm, alternatively, 0.05 mm to 0.1 mm.

In various embodiments, inserts, which may have varying shapes and dimensions, and be comprised of any suitable material, can be disposed or placed on or at least partially in any layer during the inventive method. For example, an insert can be employed in between subsequent printing steps, and the insert can become integral with the 3D printed objects upon its formation. Alternatively, the insert can be removed at any step during the inventive method, e.g., to leave a cavity or for other functional or aesthetic functions. The use of such inserts may provide better aesthetics and economics over relying on 3D printing alone.

In various embodiments, the resulting 3D printed object can be subjected to different post-processing regimes known in the art.

In general, all 3D printing processes start with a computer generated data source or program which describes an object. Next, it is converted into a standard tessellation language Step (STL) file format or other file format. Then, the file is generally read into 3D printing software, which takes the file and optionally user input to separate it into hundreds, thousands, or even millions of 'slices.' The 3D printing software typically outputs machine instructions, which can be in the form of G-code, which is read by a 3D printer system to build each slice. The machine instructions are transferred to the 3D printer system, which then builds the object, layer by layer, based on this slice information in the form of machine instructions.

In an embodiment, a computer-readable medium comprising computer executable instructions which, when executed on a data processing apparatus, causes the data processing apparatus to perform a close-packed gas sphere (CPGS) additive manufacturing (AM) method to fabricate a three-dimensional (3D) object from a liquid photocurable composition, comprising: Step (1100): feeding a first gas under pressure via a first gas cylinder to a first inlet of a first gas chamber of a first generation system operatively associated therewith for generation of a plurality of first gas jet source spheres, wherein the gas sphere assembly comprises a prep chamber, at least the first generation system, a reservoir, and at least the first gas cylinder, and the first gas comprises air, hydrogen, carbon dioxide, oxygen, nitrogen, or helium; Step (1200): feeding a liquid photocurable composition from the reservoir to a first jet source chamber and a first generation chamber of the first generation system operatively associated therewith for generation of the plurality of close-packed gas spheres; Step (1300): generating the plurality of first gas jet source spheres via the first gas under pressure entering a first gas region of the first gas chamber via the first inlet and being pushed through a plurality of first openings of a first sphere unit mounted on at least two opposing side walls of the first jet source chamber to a first collapsing region of the first jet source chamber operatively associated with a first transfer region of the first generation chamber positioned thereabove; Step (1400): generating the plurality of first closed-packed gas spheres via collapsing and rupturing of each of the plurality of first gas jet source spheres under pressure and a first gas sphere generation unit mounted on at least two opposing side walls of the first generation chamber via two opposing mounting assemblies, oscillating back and forth in a longitudinal direction via a motor assembled to at least one of the opposing mounting assemblies, generating first gas jet streams, wherein at least a portion of the first gas jet streams push the first gas from the first collapsing region of the first jet source chamber through a plurality of first micro-openings of the first gas sphere generation unit to a first transfer region of the first generation chamber operatively associated with a prep region of the prep chamber positioned thereabove, wherein a diameter of each of the plurality of first openings is larger than a diameter of each of the plurality of first micro-openings, and wherein the plurality of first closed-packed gas spheres agglomerate in the prep region of the prep chamber for transfer to the AM assembly; Step (2100): transferring the plurality of close-packed gas spheres from the prep region to a build system operatively associated therewith via a wire skimmer blade mounted to two opposing linear guides positioned throughout the gas sphere assembly and AM assembly, wherein the AM assembly comprises the wire skimmer blade, the build system, and an overflow tank, and wherein a layer of the plurality of close-packed gas spheres is formed over a build platform of the build system, and wherein the plurality of close-packed gas spheres forming the layer comprise attraction forces thereamong, wherein the layer of plurality of close-packed gas spheres is close-packed via the attraction forces; Step (2200): transferring excess close-packed gas spheres not allocated to the layer of close-packed gas spheres over the build platform to the overflow tank operatively associated with the build system via the wire skimmer blade, wherein the excess close-packed gas spheres are deposited into the overflow tank; Step (2300): irradiating the layer of close-packed gas spheres over the build platform via an AM irradiation method comprising an energy source delivery system of the build system, the energy source delivery system including an energy source and at least one optical device operatively associated with the build platform, selectively redirecting the energy source to the build platform, wherein a cross-sectional layer of a 3D printed object is at least partially cured, and wherein the energy source emits at least one of ultraviolet (UV) radiation, infrared (IR) radiation, or visible light; Step (2400): moving the build platform downwards in a z-direction by a distance greater than a layer thickness via an elevatable device operatively associated therewith; Step (2500): re-positioning the wire skimmer blade to an original position of the AM method; Step (2600): moving the build platform upwards in a z-direction to a layer thickness via the elevatable device operatively associated therewith; Step (2700): determining if an additional layer is needed, if no, performing Step (3000), if yes, performing Step (2800); Step (2800): determining if a second generation system is present, if no, repeating Step (1100), Step (1200), Step (1300), Step (1400), Step (2100), Step (2200), Step (2300), Step (2400), Step (2500), Step (2600), Step (2700), and Step (2800) a selected number of times to fabricate a selected number of successive layers, wherein the successive layers are bonded to each other, if yes, performing Step (2900); Step (2900): determining if a plurality of second closed-packed gas spheres is to be generated, if no, performing Step (1100), Step (1200), Step (1300), Step (1400), Step (2100), Step (2200), Step (2300), Step (2400), Step (2500), Step (2600), Step (2700), Step (2800), when determined, and Step (2900), when determined, if yes, performing Step (1102), Step (1202), Step (1302), Step (1402), Step (2100), Step (2200), Step (2300), Step (2400), Step (2500), Step (2600), Step (2700), Step (2800), when determined, and Step (2900), when determined, wherein the first closed-packed gas spheres layer and second closed-packed gas spheres layer are separately generated a selected number of times to fabricate a selected number of successive layers, wherein the successive layers are bonded to each other, and wherein Step (1102), Step (1202), Step (1302), Step (1402) comprise: Step (1102): feeding a second gas under pressure via a second gas cylinder to a second inlet of a second gas chamber of the second generation system operatively associated therewith for generation of a plurality of second gas jet source spheres, wherein the gas sphere assembly further comprises the second generation system and the second gas cylinder, and wherein the second gas comprises air, hydrogen, carbon dioxide, oxygen, nitrogen, or helium; Step (1202): feeding a liquid photocurable composition from the reservoir to a second jet source chamber and a second generation chamber of the second generation system operatively associated therewith for generation of the plurality of close-packed gas spheres; Step (1302): generating the plurality of second gas jet source spheres via the second gas under pressure entering a second gas region of the second gas chamber via the second inlet and being pushed through a plurality of second openings of a second sphere unit mounted on at least two opposing side walls of the second jet source chamber to a second collapsing region of the second jet source chamber operatively associated with a second transfer region of the second generation chamber positioned thereabove; and Step (1402): generating the plurality of second closed-packed gas spheres via collapsing and rupturing of each of the plurality of second gas jet source spheres under pressure and a second gas sphere generation unit mounted on at least two opposing side walls of the second generation chamber via two opposing mounting assemblies, oscillating back and forth in a longitudinal direction via a motor assembled to at least one of the opposing mounting assemblies, generating second gas jet streams, wherein at least a portion of the second gas jet streams push the second gas from a second collapsing region of a second jet source chamber through a plurality of second micro-openings of the second gas sphere generation unit to a second transfer region of the second generation chamber operatively associated with the prep region of the prep chamber positioned thereabove, wherein a diameter of each of the plurality of second openings is larger than a diameter of each of the plurality of second micro-openings, and wherein the first generation chamber, first jet source chamber, and first gas chamber of the first generation system are integrally formed and separate from the prep chamber of the gas sphere assembly and the second generation chamber, second jet source chamber, and second gas chamber are integrally formed and separate from the prep chamber of the gas sphere assembly, and wherein the plurality of first closed-packed gas spheres agglomerate in the prep region of the prep chamber for transfer to the AM assembly. The plurality of first closed-packed gas spheres and the plurality of second closed-packed gas spheres are both employed for 3D fabrication of CPGS objects.

Numerous different objects can be made by the system and method for three-dimensional (3D) fabrication of close-packed gas sphere (CPGS), including both large-scale models or prototypes, small custom 3D printed objects, miniature or microminiature 3D printed objects or devices, etc.

In various embodiments, and an example, and not to be limiting, the 3D printed object can have a height in a range of from substantially 1 mm up to 500 mm, or more, and/or a maximum width in a range of from substantially 30 mm up to 500 mm, or more. These are examples only: maximum size and width depends on the architecture of the AM system and the resolution of the light source and can be adjusted depending upon the particular goal of the embodiment or object being fabricated.

For 3D printed objects fabricated using VAT photopolymerization, the mechanical properties thereof are dependent upon fabrication parameter choices. However, control and consistency of the mechanical properties is problematic as factors such as light source power, wavelength, fabrication speed, and liquid photocurable composition, among others, affect the curing or hardening of the liquid photocurable composition. This challenge is compounded when fabricating VAT photopolymerized 3D printed objects which are light in weight.

Fabrication of lighter VAT photopolymerized 3D printed objects have become popular, with fabrication cost and weight of 3D printed objects directly related to the weight and volume of the liquid photocurable composition effectively employed therein and emerging uses in different industry sectors, such as automotive and industrial manufacturing, aerospace, pharma and healthcare, retail, and sports. One technique used when designing weight effective 3D shapes is to reduce the interior material thereof while still fabricating a durable 3D printed object. However, there exist minimum feature size and structural design limitations for VAT photopolymerized 3D printed objects. In addition, light weight VAT photopolymerized 3D printed objects often suffer from inhomogeneous structural integrity as problematic control and consistency during the fabrication processes affects the mechanical properties thereof.

In the various embodiments of the system and method for three-dimensional (3D) fabrication of close-packed gas sphere (CPGS) objects, not only can topology optimization while working with lattice structures (e.g., honeycombs, trusses) be used in the design of 3D printed objects to reduce the interior material thereof, closed-packed gas spheres can be employed to also inherently reduce the interior material of the 3D printed objects while overcoming the minimum feature size and structural design limitations for VAT photopolymerized 3D printed objects, as minimal wall thicknesses would be made up of pressurized air surrounded by a thin film of a liquid photocurable composition having attraction forces thereamong. In addition, in the various embodiments, the attraction forces between the closed-packed gas spheres can increase the homogeneous structural integrity of the photopolymerized 3D printed objects. The 3D printed closed-packed gas sphere objects, as an example, and not to be limiting, often weigh 5% to 50% less than their comparable solid form. However, they remain strong, due to their internal homogeneous cellular structure. Even further, different combinations of closed-packed gas sphere sizes and pressurized gasses can be employed for controlling the interior structure of the photopolymerized 3D printed objects. For example, and not to be limiting, different pressurized gasses can be employed, such that the closed-packed gas spheres collapse, expand, or contract under different environmental conditions at varying times for different uses.

The system and method for three-dimensional (3D) fabrication of close-packed gas sphere (CPGS) objects generate gas spheres using an AM processes for liquid photocurable compositions, such that a final 3D printed object is fabricated in a layer-by-layer fashion as a build platform does not move through a polymerizable liquid photocurable composition. Independently tuned microscale porosity using a plurality of close-packed gas spheres can be achieved. After solidification, the resulting object consists of a pressurized gas surrounded by a liquid photocurable composition on multiple length scales. As porosity is incorporated into a structure (e.g., lightweight hexagonal and triangular honeycombs, with tunable geometry, density, and stiffness), mechanical properties that the 3D printed object would otherwise not have can be achieved.

The inventive method, steps thereof, inventive composition, and components thereof, are generally as described above. All combinations of the aforementioned embodiments are hereby expressly contemplated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results can be obtained from each member of the respective Markush group independent from all other Markush members. Each member of a Markush group can be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges can be further delineated into relevant halves, thirds, quarters, fifths, and so on. As just one example, a range "of from 0.1 to 0.9" can be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and can be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange can be relied upon individually and/or collectively and provides adequate support for specific embodiments within the scope of the appended claims. Finally, an individual number within a disclosed range can be relied upon and provides adequate support for specific embodiments within the scope of the appended claims. For example, a range "of from 1 to 9" includes various individual integers, such as 3, as well as individual numbers including a decimal point (or fraction), such as 4.1, which can be relied upon and provide adequate support for specific embodiments within the scope of the appended claims.

The present application has been described herein in an illustrative manner, and it is to be understood that the terminology which has been used is intended to be in the nature of words of description rather than of limitation. Many modifications and variations of the present invention are possible in light of the above teachings. The present invention can be practiced otherwise than as specifically described within the scope of the appended claims. The subject matter of all combinations of independent and dependent claims, both single and multiple dependent, is herein expressly contemplated.

What is claimed is:

1. An additive manufacturing (AM) system configured to fabricate a three-dimensional (3D) object from a liquid photocurable composition, comprising:
   a gas sphere assembly, comprising:
      a prep chamber, having a prep region containing a plurality of close-packed gas spheres;
      a first generation system operatively associated with the prep chamber, positioned thereunder, generating the plurality of first closed-packed gas spheres;
      a reservoir operatively associated with the first generation system, feeding the liquid photocurable composition thereto for generation of the plurality of first close-packed gas spheres; and
      a first gas cylinder operatively associated with the first generation system, feeding a first gas under pressure to the first generation system,
      wherein the first gas and the liquid photocurable composition are fed to the first generation system, generating the plurality of first closed-packed gas spheres comprising a pressurized gas surrounded by a thin film of a liquid photocurable composition; and
   an AM assembly operatively associated with the gas sphere assembly, performing an AM irradiation method employing the plurality of close-packed gas spheres.

2. The AM system of claim 1, wherein the first generation system comprises:
   a first generation chamber, generating the plurality of first closed-packed gas spheres, comprising a first gas sphere generation unit having a plurality of first micro-openings therethrough, mounted on at least two opposing side walls of the first generation chamber via two opposing mounting assemblies, and a first transfer region operatively associated with the prep chamber, wherein the two opposing mounting assemblies comprise a motor assembled to at least one of the opposing mounting assemblies, oscillating the first gas sphere generation unit back and forth in a longitudinal direction;
   a first jet source chamber, generating a plurality of first gas jet source spheres, comprising a first sphere unit having a plurality of first openings therethrough, mounted on at least two opposing side walls of the first jet source chamber, and a first collapsing region operatively associated with the first generation chamber, wherein a diameter of each of the plurality of first openings is larger than a diameter of each of the plurality of first micro-openings; and
   a first gas chamber, feeding the first gas to the first jet source chamber, comprising an inlet and a first gas region operatively associated with the first jet source chamber,
   wherein when the first gas is fed to the first gas chamber and the liquid photocurable composition is fed to the first jet source chamber and first generation chamber, the first gas is pushed through the plurality of first openings, generating the plurality of first gas jet source spheres, wherein each of the plurality of first gas jet source spheres collapse and rupture via the oscillating first gas sphere generation unit, generating first gas jet streams, wherein at least a portion of the first gas jet streams push the first gas through the plurality of first micro-openings, generating the plurality of first closed-packed gas spheres, and wherein the plurality of first closed-packed gas spheres agglomerate in the prep region of the prep chamber as the plurality of closed-packed gas spheres.

3. The AM system of claim 1, wherein the AM assembly comprises:
   a wire skimmer blade operatively associated with the gas sphere assembly and AM assembly, transferring the plurality of close-packed gas spheres from the gas sphere assembly to the AM assembly;
   a build system operatively associated with the wire skimmer blade and gas sphere assembly, fabricating a three-dimensional (3D) object made of the plurality of close-packed gas spheres via the AM irradiation method of the AM system, comprising:
      a build platform operatively associated with the prep region of the gas sphere assembly, moving in an upward and downward z-direction via an elevatable device operatively associated therewith, wherein the wire skimmer blade transfers the plurality of close-packed gas spheres from the prep region to the build platform, forming a layer of close-packed gas spheres thereon, wherein the plurality of close-packed gas spheres forming the layer comprise attraction forces thereamong, wherein the layer of plurality of close-packed gas spheres is close-packed via the attraction forces; and
      an energy source delivery system including an energy source, and at least one optical device operatively associated with the energy source and build platform, irradiating the layer of close-packed gas spheres over the build platform, wherein the at least one optical device is configured to selectively redirect a light of the energy source to the build platform, and wherein a cross-sectional layer of a 3D printed object is at least partially cured, wherein the energy source emits at least one of ultraviolet (UV) radiation, infrared (IR) radiation, or visible light; and
   an overflow tank operatively associated with the build platform of the build system, containing excess plurality of close-packed gas spheres therein, wherein the wire skimmer blade transfers and deposits the excess plurality of close-packed gas spheres not allocated to the layer of close-packed gas spheres on the build platform into the overflow tank.

4. The AM system of claim 3, wherein the wire skimmer blade comprises a plurality of single wires mounted to at least two opposing braces, each having adjustable and variable speed motor assemblies thereon for attachment to two opposing linear guides and movement thereabout, moving between the gas sphere assembly and the AM assembly at an angle to a longitudinal plane of the gas sphere assembly and the AM assembly of between 45° degrees and 90° degrees, wherein a distance between the plurality of single wires is smaller than the diameter of the plurality of gas spheres, such that air flows therethrough and the plurality of gas spheres are intercepted, transferring the plurality of close-packed gas spheres from the gas sphere assembly to the AM assembly.

5. The AM system of claim 1, wherein the AM irradiation method of the AM system comprises scan, spin, and selectively photocure (3SP), digital light processing (DLP) and stereolithography (SLA or SL).

6. The AM system of claim 1, wherein the gas sphere assembly further comprises:
   a second generation system operatively associated with the prep chamber, positioned thereunder, generating a plurality of second closed-packed gas spheres; and
   a second gas cylinder operatively associated with the second generation system, feeding a second gas under pressure to the second generation system,
   wherein the first generation system is formed separate from the prep chamber,
   wherein the second generation chamber is formed separate from the prep chamber, and
   wherein the second gas and liquid photocurable composition are fed to the second generation system, generating the plurality of second closed-packed gas spheres.

7. The AM system of claim 6, wherein the second generation system comprises:
   a second generation chamber, generating the plurality of second closed-packed gas spheres, comprising a second gas sphere generation unit having a plurality of second micro-openings therethrough, mounted on at least two opposing side walls of the second generation chamber via two opposing mounting assemblies, and a second transfer region operatively associated with the prep chamber, wherein the two opposing mounting assemblies comprise a motor assembled to at least one of the opposing mounting assemblies, oscillating the second gas sphere generation unit back and forth in a longitudinal direction;
   a second jet source chamber, generating a plurality of second gas jet source spheres, comprising a second sphere unit having a plurality of second openings therethrough, mounted on at least two opposing side walls of the second jet source chamber, and a second collapsing region operatively associated with the second generation chamber, wherein a diameter of each of the plurality of second openings is larger than a diameter of each of the plurality of second micro-openings; and
   a second gas chamber, feeding the second gas under pressure to the second jet source chamber, comprising an inlet and a second gas region operatively associated with the second jet source chamber,
   wherein the reservoir is operatively associated with the second jet source chamber and second generation chamber, feeding the liquid photocurable composition thereto for generation of the plurality of second close-packed gas spheres; and
   wherein when the second gas is fed to the second gas chamber and the liquid photocurable composition is fed to the second jet source chamber and second generation chamber, the second gas is pushed through the plurality of second openings, generating the plurality of second gas jet source spheres, wherein each of the plurality of second gas jet source spheres collapse and rupture via the oscillating second gas sphere generation unit, generating second gas jet streams, wherein at least a portion of the second gas jet streams push the second gas through the plurality of second micro-openings, generating the plurality of second closed-packed gas spheres, and wherein the plurality of second closed-packed gas spheres agglomerate in the prep region of the prep chamber as the plurality of closed-packed gas spheres.

8. The AM system of claim 6, wherein the first gas cylinder and the second gas cylinder are the same gas cylinder.

9. The AM system of claim 7, wherein the diameter of the plurality of first micro-openings is different from that of the diameter of the plurality of second micro-openings.

10. The AM system of claim 1, wherein the first gas comprises air, hydrogen, carbon dioxide, oxygen, nitrogen, or helium.

11. The AM system of claim 6, wherein the second gas comprises air, hydrogen, carbon dioxide, oxygen, nitrogen, or helium.

* * * * *